US007146313B2

(12) United States Patent
Chen et al.

(10) Patent No.: US 7,146,313 B2
(45) Date of Patent: Dec. 5, 2006

(54) TECHNIQUES FOR MEASUREMENT OF PERCEPTUAL AUDIO QUALITY

(75) Inventors: Wei-Ge Chen, Issaquah, WA (US); Naveen Thumpudi, Sammamish, WA (US); Ming-Chieh Lee, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 965 days.

(21) Appl. No.: 10/017,861

(22) Filed: Dec. 14, 2001

(65) Prior Publication Data

US 2003/0115042 A1 Jun. 19, 2003

(51) Int. Cl.
*G01L 19/00* (2006.01)

(52) U.S. Cl. .................................... 704/230; 704/200.1

(58) Field of Classification Search ............. 704/200.1, 704/200, 223, 229, 230, 500, 201; 375/240.03
See application file for complete search history.

(56) References Cited

U.S. PATENT DOCUMENTS

| | | | |
|---|---|---|---|
| 5,686,964 | A | 11/1997 | Tabatabai et al. |
| 5,845,243 | A | 12/1998 | Smart et al. |
| 5,995,151 | A | 11/1999 | Naveen et al. |
| 6,029,126 | A | 2/2000 | Malvar |
| 6,058,362 | A | 5/2000 | Malvar |
| 6,115,689 | A | 9/2000 | Malvar |
| 6,182,034 | B1 | 1/2001 | Malvar |
| 6,240,380 | B1 | 5/2001 | Malvar |
| 6,810,083 | B1 | 10/2004 | Chen et al. |

OTHER PUBLICATIONS

Gibson et al., *Digital Compression for Multimedia*, Title Page, Contents, "Chapter 7: Frequency Domain Coding," Morgan Kaufman Publishers, Inc., pp. iii, v-xi, and 227-262 (1998).

H.S. Malvar, *Signal Processing with Lapped Transforms*, Artech House, Norwood, MA, pp. iv, vii-xi, 175-218 and 353-357 (1992).

H.S. Malvar, "Lapped Transforms for Efficient Transform/Subband Coding," *IEEE Transactions on Acoustics, Speech and Signal Processing*, vol. 38, No. 6, pp. 969-978 (1990).

Seymour Schlien, "The Modulated Lapped Transform, Its Time-Varying Forms, and Its Application to Audio Coding Standards," *IEEE Transactions on Speech and Audio Processing*, vol. 5, No. 4, pp. 359-366 (Jul. 1997).

de Queiroz et al., "Time-Varying Lapped Transforms and Wavelet Packets," *IEEE Transactions on Signal Processing*, vol. 41, pp. 3293-3305 (1993).

(Continued)

*Primary Examiner*—Angela Armstrong
(74) *Attorney, Agent, or Firm*—Klarquist Sparkman, LLP

(57) ABSTRACT

An audio processing tool measures the quality of reconstructed audio data. For example, an audio encoder measures the quality of a block of reconstructed frequency coefficient data in a quantization loop. The invention includes several techniques and tools, which can be used in combination or separately. First, before measuring quality, the tool normalizes the block to account for variation in block sizes. Second, for the quality measurement, the tool processes the reconstructed data by critical bands, which can differ from the quantization bands used to compress the data. Third, the tool accounts for the masking effect of the reconstructed data, not just the masking effect of the original data. Fourth, the tool band weights the quality measurement, which can be used to account for noise substitution or band truncation. Finally, the tool changes quality measurement techniques depending on the channel coding mode.

25 Claims, 12 Drawing Sheets

OTHER PUBLICATIONS

Herley et al., "Tilings of the Time-Frequency Plane: Construction of Arbitrary Orthogonal Bases and Fast Tiling Algorithms," *IEEE Transactions on Signal Processing*, vol. 41, No. 12, pp. 3341-3359 (1993).

ISO/IEC 11172-3, Information Technology—Coding of Moving Pictures and Associated Audio for Digital Storage Media at Up to About 1.5 Mbits—Part 3: Audio, 154 pp. (1993).

Dolby Laboratories, "AAC Technology," 4 pp. [Downloaded from the web site aac-audio.com on World Wide Web on Nov. 21, 2001.].

Srinivasan et al., "High-Quality Audio Compression Using an Adaptive Wavelet Packet Decomposition and Psychoacoustic Modeling," *IEEE Transactions on Signal Processing*, vol. 46, No. 4, pp. 1085-1093 (Apr. 1998).

Caetano et al., "Rate Control Strategy for Embedded Wavelet Video Coders," *Electronics Letters*, pp. 1815-1817 (Oct. 14, 1999).

Ribas Corbera et al., "Rate Control in DCT Video Coding for Low-Delay Communications," *IEEE Transactions on Circuits and Systems for Video Technology*, vol. 9, No. 1, pp. 172-185 (Feb. 1999).

Zwicker et al., *Das Ohr als Nachrichtenempfänger*, Title Page, Table of Contents, "I: Schallschwingungen," Index, Hirzel-Verlag, Stuttgart, pp. III, IX-XI, 1-26, and 231-232 (1967).

Terhardt, "Calculating Virtual Pitch," *Hearing Research*, 1:155-182 (1979).

Lufti, "Additivity of Simultaneous Masking," *Journal of Acoustic Society of America*, 73:262-267 (1983).

Jesteadt et al., "Forwarding Masking as a Function of Frequency, Masker Level, and Signal Delay," *Journal of Acoustical Society of America*, 71:950-962 (1982).

ITU, Recommendation ITU-R BS 1387, Method for Objective Measurements of Perceived Audio Quality, 89 pp. (1998).

ITU, Recommendation ITU-R BS 1115, Low Bit-Rate Audio Coding, 9 pp. (1994).

Beerends, "Audio Quality Determination Based on Perceptual Measurement Techniques," *Applications of Digital Signal Processing to Audio and Acoustics*, Chapter 1, Ed. Mark Kahrs, Karlheinz Brandenburg, Kluwer Acad. Publ., pp. 1-38 (1998).

Zwicker, *Psychoakustik*, Title Page, Table of Contents, "Teil I: Einfuhrung," Index, Springer-Verlag, Berlin Heidelberg, New York, pp. II, IX-XI, 1-30, and 157-162 (1982).

Solari, *Digital Video and Audio Compression*, Title Page, Contents, "Chapter 8: Sound and Audio," McGraw-Hill, Inc., pp. iii, v-vi, and 187-211 (1997).

A.M. Kondoz, *Digital Speech: Coding for Low Bit Rate Communications Systems*, "Chapter 3.3: Linear Predictive Modeling of Speech Signals" and "Chapter 4: LPC Parameter Quantisation Using LSFs," John Wiley & Sons, pp. 42-53 and 79-97 (1994).

Kadatch, U.S. Appl. No. 09/771,371, entitled, "Quantization Loop with Heuristic Approach," filed Jan. 26, 2001.

Chen et al., U.S. Appl. No. 10/017,694, entitled, "Quality and Rate Control Strategy for Digital Audio," filed Dec. 14, 2001.

Chen et al., U.S. Appl. No. 10/017,702, entitled, "Quantization Matrices for Digital Audio," filed Dec. 14, 2001.

Chen et al., U.S. Appl. No. 10/020,708, entitled "Adaptive Window-Size Selection in Transform Coding," filed Dec. 14, 2001.

Chen et al., U.S. Appl. No. 10/016,918, entitled, "Quality Improvement Techniques in an Audio Encoder," filed Dec. 14, 2001.

Wragg et al., "An Optimised Software Solution for an ARM Powered™ MP3 Decoder," 9 pp. [Downloaded from the World Wide Web on Oct. 27, 2001.].

Fraunhofer-Gesellschaft, "MPEG Audio Layer-3," 4 pp. [Downloaded from the World Wide Web on Oct. 24, 2001.].

Fraunhofer-Gesellschaft, "MPEG-2 AAC," 3 pp. [Downloaded from the World Wide Web on Oct. 24, 2001.].

OPTICOM GmbH, "Objective Perceptual Measurement," 14 pp. [Downloaded from the World Wide Web on Oct. 24, 2001.].

De Luca, "AN1090 Applications Note: STA013 MPEG 2.5 Layer III Source Decoder," STMicroelectronics, 17 pp. (1999).

Phamdo, "Speech Compression," 13 pp. [Downloaded from the World Wide Web on Nov. 25, 2001.].

Malvar, "Biorthogonal and Nonuniform Lapped Transforms for Transform Coding with Reduced Blocking and Ringing Artifacts," appeared in *IEEE Transactions on Signal Processing, Special Issue on Multirate Systems, Filter Banks, Wavelets, and Applications*, vol. 46, 29 pp. (1998).

Figure 1, Prior Art
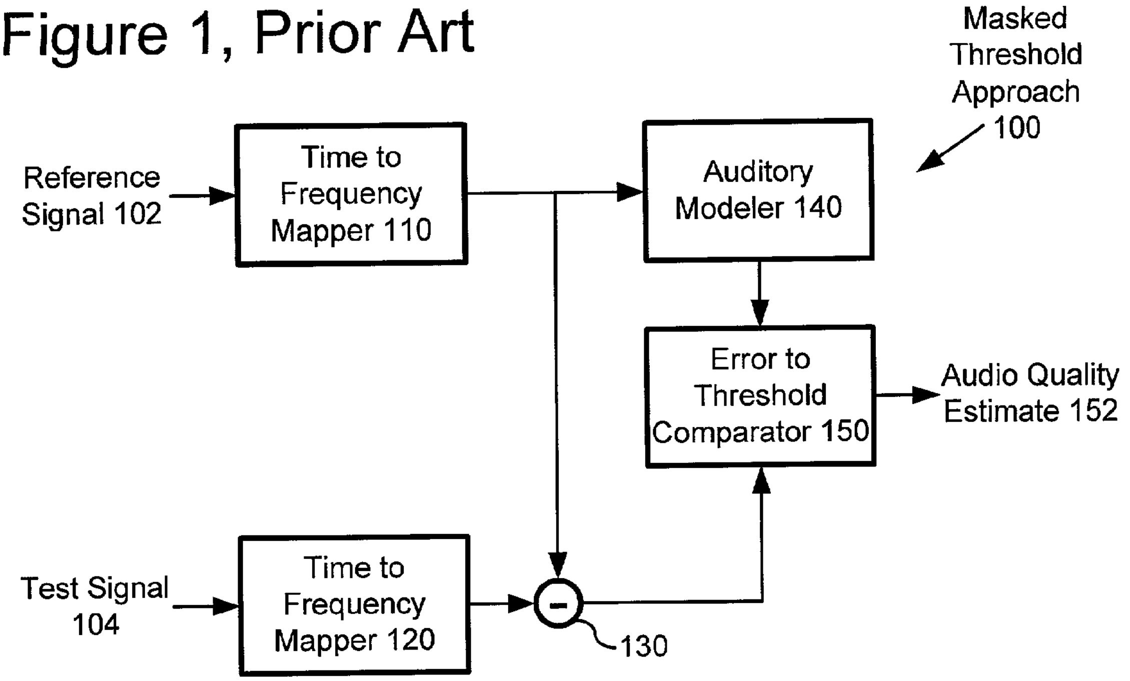
Figure 2
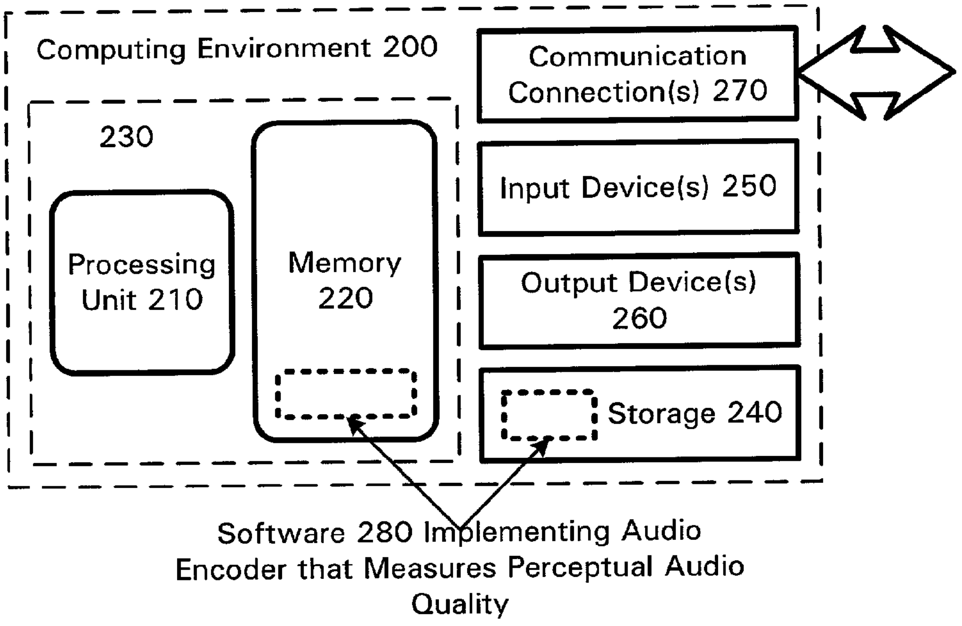

TECHNIQUES FOR MEASUREMENT OF PERCEPTUAL AUDIO QUALITY

RELATED APPLICATION INFORMATION

The following concurrently filed U.S. patent applications relate to the present application: 1) U.S. patent application Ser. No. 10/020,708, entitled, "Adaptive Window-Size Selection in Transform Coding," filed Dec. 14, 2001, the disclosure of which is hereby incorporated by reference; 2) U.S. patent application Ser. No. 10/016,918, entitled, "Quality Improvement Techniques in an Audio Encoder," filed Dec. 14, 2001, the disclosure of which is hereby incorporated by reference; 3) U.S. patent application Ser. No. 10/017,702, entitled, "Quantization Matrices for Digital Audio," filed Dec. 14, 2001, now U.S. Pat. No. 6,934,677, the disclosure of which is hereby incorporated by reference; and 4) U.S. patent application Ser. No. 10/017,694, entitled, "Quality and Rate Control Strategy for Digital Audio," filed Dec. 14, 2001, now U.S. Pat. No. 7,027,982, the disclosure of which is hereby incorporated by reference.

TECHNICAL FIELD

The present invention relates to techniques for measurement of perceptual audio quality. In one embodiment, an audio encoder measures perceptual audio quality.

BACKGROUND

With the introduction of compact disks, digital wireless telephone networks, and audio delivery over the Internet, digital audio has become commonplace. Engineers use a variety of techniques to measure the quality of digital audio. To understand these techniques, it helps to understand how audio information is represented in a computer and how humans perceive audio.

I. Representation of Audio Information in a Computer

A computer processes audio information as a series of numbers representing the audio information. For example, a single number can represent an audio sample, which is an amplitude (i.e., loudness) at a particular time. Several factors affect the quality of the audio information, including sample depth, sampling rate, and channel mode.

Sample depth (or precision) indicates the range of numbers used to represent a sample. The more values possible for the sample, the higher the quality because the number can capture more subtle variations in amplitude. For example, an 8-bit sample has 256 possible values, while a 16-bit sample has 65,536 possible values.

The sampling rate (usually measured as the number of samples per second) also affects quality. The higher the sampling rate, the higher the quality because more frequencies of sound can be represented. Some common sampling rates are 8,000, 11,025, 22,050, 32,000, 44,100, 48,000, and 96,000 samples/second.

Mono and stereo are two common channel modes for audio. In mono mode, audio information is present in one channel. In stereo mode, audio information is present in two channels usually labeled the left and right channels. Other modes with more channels, such as 5-channel surround sound, are also possible. Table 1 shows several formats of audio with different quality levels, along with corresponding raw bitrate costs.

TABLE 1

Bitrates for different quality audio information

| Quality | Sample Depth (bits/sample) | Sampling Rate (samples/second) | Mode | Raw Bitrate (bits/second) |
|---|---|---|---|---|
| Internet telephony | 8 | 8,000 | mono | 64,000 |
| telephone | 8 | 11,025 | mono | 88,200 |
| CD audio | 16 | 44,100 | stereo | 1,411,200 |
| high quality audio | 16 | 48,000 | stereo | 1,536,000 |

As Table 1 shows, the cost of high quality audio information such as CD audio is high bitrate. High quality audio information consumes large amounts of computer storage and transmission capacity.

Compression (also called encoding or coding) decreases the cost of storing and transmitting audio information by converting the information into a lower bitrate form. Compression can be lossless (in which quality does not suffer) or lossy (in which quality suffers). Decompression (also called decoding) extracts a reconstructed version of the original information from the compressed form.

Quantization is a conventional lossy compression technique. There are many different kinds of quantization including uniform and non-uniform quantization, scalar and vector quantization, and adaptive and non-adaptive quantization. Quantization maps ranges of input values to single values. For example, with uniform, scalar quantization by a factor of 3.0, a sample with a value anywhere between −1.5 and 1.499 is mapped to 0, a sample with a value anywhere between 1.5 and 4.499 is mapped to 1, etc. To reconstruct the sample, the quantized value is multiplied by the quantization factor, but the reconstruction is imprecise. Continuing the example started above, the quantized value 1 reconstructs to $1\times3=3$; it is impossible to determine where the original sample value was in the range 1.5 to 4.499. Quantization causes a loss in fidelity of the reconstructed value compared to the original value. Quantization can dramatically improve the effectiveness of subsequent lossless compression, however, thereby reducing bitrate.

An audio encoder can use various techniques to provide the best possible quality for a given bitrate, including transform coding, rate control, and modeling human perception of audio. As a result of these techniques, an audio signal can be more heavily quantized at selected frequencies or times to decrease bitrate, yet the increased quantization will not significantly degrade perceived quality for a listener.

Transform coding techniques convert data into a form that makes it easier to separate perceptually important information from perceptually unimportant information. The less important information can then be quantized heavily, while the more important information is preserved, so as to provide the best perceived quality for a given bitrate. Transform coding techniques typically convert data into the frequency (or spectral) domain. For example, a transform coder converts a time series of audio samples into frequency coefficients. Transform coding techniques include Discrete Cosine Transform ["DCT"], Modulated Lapped Transform ["MLT"], and Fast Fourier Transform ["FFT"]. In practice, the input to a transform coder is partitioned into blocks, and each block is transform coded. Blocks may have varying or fixed sizes, and may or may not overlap with an adjacent block. After transform coding, a frequency range of coefficients may be grouped for the purpose of quantization, in which case each coefficient is quantized like the others in the group, and the frequency range is called a quantization band. For more information about transform coding and MLT in particular, see Gibson et al., *Digital Compression for Multimedia,* "Chapter 7: Frequency Domain Coding," Morgan Kaufman Publishers, Inc., pp. 227–262 (1998); U.S. Pat. No. 6,115,689 to Malvar; H. S. Malvar, *Signal Processing with Lapped Transforms,* Artech House, Norwood, Mass., 1992; or Seymour Schlein, "The Modulated Lapped Transform, Its Time-Varying Forms, and Its Application to Audio Coding Standards," IEEE Transactions on Speech and Audio Processing, Vol. 5, No. 4, pp. 359–66, July 1997.

With rate control, an encoder adjusts quantization to regulate bitrate. For audio information at a constant quality, complex information typically has a higher bitrate (is less compressible) than simple information. So, if the complexity of audio information changes in a signal, the bitrate may change. In addition, changes in transmission capacity (such as those due to Internet traffic) affect available bitrate in some applications. The encoder can decrease bitrate by increasing quantization, and vice versa. Because the relation between degree of quantization and bitrate is complex and hard to predict in advance, the encoder can try different degrees of quantization to get the best quality possible for some bitrate, which is an example of a quantization loop.

II. Human Perception of Audio Information

In addition to the factors that determine objective audio quality, perceived audio quality also depends on how the human body processes audio information. For this reason, audio processing tools often process audio information according to an auditory model of human perception.

Typically, an auditory model considers the range of human hearing and critical bands. Humans can hear sounds ranging from roughly 20 Hz to 20 kHz, and are most sensitive to sounds in the 2–4 kHz range. The human nervous system integrates sub-ranges of frequencies. For this reason, an auditory model may organize and process audio information by critical bands. For example, one critical band scale groups frequencies into 24 critical bands with upper cut-off frequencies (in Hz) at 100, 200, 300, 400, 510, 630, 770, 920, 1080, 1270, 1480, 1720, 2000, 2320, 2700, 3150, 3700, 4400, 5300, 6400, 7700, 9500, 12000, and 15500. Different auditory models use a different number of critical bands (e.g., 25, 32, 55, or 109) and/or different cut-off frequencies for the critical bands. Bark bands are a well-known example of critical bands.

Aside from range and critical bands, interactions between audio signals can dramatically affect perception. An audio signal that is clearly audible if presented alone can be completely inaudible in the presence of another audio signal, called the masker or the masking signal. The human ear is relatively insensitive to distortion or other loss in fidelity (i.e., noise) in the masked signal, so the masked signal can include more distortion without degrading perceived audio quality. Table 2 lists various factors and how the factors relate to perception of an audio signal.

TABLE 2

Various factors that relate to perception of audio

| Factor | Relation to Perception of an Audio Signal |
|---|---|
| outer and middle ear transfer | Generally, the outer and middle ear attenuate higher frequency information and pass middle frequency information. Noise is less audible in higher frequencies than middle frequencies. |
| noise in the auditory nerve | Noise present in the auditory nerve, together with noise from the flow of blood, increases for low frequency information. Noise is less audible in lower frequencies than middle frequencies. |
| perceptual frequency scales | Depending on the frequency of the audio signal, hair cells at different positions in the inner ear react, which affects the pitch that a human perceives. Critical bands relate frequency to pitch. |
| excitation | Hair cells typically respond several milliseconds after the onset of the audio signal at a frequency. After exposure, hair cells and neural processes need time to recover full sensitivity. Moreover, loud signals are processed faster than quiet signals. Noise can be masked when the ear will not sense it. |
| detection | Humans are better at detecting changes in loudness for quieter signals than louder signals. Noise can be masked in louder signals. |
| simultaneous masking | For a masker and maskee present at the same time, the maskee is masked at the frequency of the masker but also at frequencies above and below the masker. The amount of masking depends on the masker and maskee structures and the masker frequency. |
| temporal masking | The masker has a masking effect before and after than the masker itself. Generally, forward masking is more pronounced than backward masking. The masking effect diminishes further away from the masker in time. |
| loudness | Perceived loudness of a signal depends on frequency, duration, and sound pressure level. The components of a signal partially mask each other, and noise can be masked as a result. |
| cognitive processing | Cognitive effects influence perceptual audio quality. Abrupt changes in quality are objectionable. Different components of an audio signal are important in different applications (e.g., speech vs. music). |

An auditory model can consider any of the factors shown in Table 2 as well as other factors relating to physical or neural aspects of human perception of sound. For more information about auditory models, see:

1) Zwicker and Feldtkeller, "Das Ohr als Nachrichtenempfänger," Hirzel-Verlag, Stuttgart, 1967;
2) Terhardt, "Calculating Virtual Pitch," Hearing Research, 1:155–182, 1979;
3) Lufti, "Additivity of Simultaneous Masking," Journal of Acoustic Society of America, 73:262 267, 1983;
4) Jesteadt et al., "Forward Masking as a Function of Frequency, Masker Level, and Signal Delay," Journal of Acoustical Society of America, 71:950–962, 1982;
5) ITU, Recommendation ITU-R BS 1387, Method for Objective Measurements of Perceived Audio Quality, 1998;
6) Beerends, "Audio Quality Determination Based on Perceptual Measurement Techniques," *Applications of Digital Signal Processing to Audio and Acoustics,* Chapter 1, Ed. Mark Kahrs, Karlheinz Brandenburg, Kluwer Acad. Publ., 1998; and
7) Zwicker, *Psychoakustik,* Springer-Verlag, Berlin Heidelberg, New York, 1982.

III. Measuring Audio Quality

In various applications, engineers measure audio quality. For example, quality measurement can be used to evaluate the performance of different audio encoders or other equipment, or the degradation introduced by a particular processing step. For some applications, speed is emphasized over accuracy. For other applications, quality is measured off-line and more rigorously.

Subjective listening tests are one way to measure audio quality. Different people evaluate quality differently, however, and even the same person can be inconsistent over time. By standardizing the evaluation procedure and quantifying the results of evaluation, subjective listening tests can be made more consistent, reliable, and reproducible. In many applications, however, quality must be measured quickly or results must be very consistent over time, so subjective listening tests are inappropriate.

Conventional measures of objective audio quality include signal to noise ratio ["SNR"] and distortion of the reconstructed audio signal compared to the original audio signal. SNR is the ratio of the amplitude of the noise to the amplitude of the signal, and is usually expressed in terms of decibels. Distortion D can be calculated as the square of the differences between original values and reconstructed values.

$$D=(u-q(u)Q)^2, \tag{1}$$

where u is an original value, q(u) is a quantized version of the original value, and Q is a quantization factor. Both SNR and distortion are simple to calculate, but fail to account for the audibility of noise. Namely, SNR and distortion fail to account for the varying sensitivity of the human ear to noise at different frequencies and levels of loudness, interaction with other sounds present in the signal (i.e., masking), or the physical limitations of the human ear (i.e., the need to recover sensitivity). Both SNR and distortion fail to accurately predict perceived audio quality in many cases.

ITU-R BS 1387 is an international standard for objectively measuring perceived audio quality. The standard describes several quality measurement techniques and auditory models. The techniques measure the quality of a test audio signal compared to a reference audio signal, in mono or stereo mode.

FIG. 1 shows a masked threshold approach (100) to measuring audio quality described in ITU-R BS 1387, Annex 1, Appendix 4, Sections 2, 3, and 4.2. In the masked threshold approach (100), a first time to frequency mapper (110) maps a reference signal (102) to frequency data, and a second time to frequency mapper (120) maps a test signal (104) to frequency data. A subtractor (130) determines an error signal from the difference between the reference signal frequency data and the test signal frequency data. An auditory modeler (140) processes the reference signal frequency data, including calculation of a masked threshold for the reference signal. The error to threshold comparator (150) then compares the error signal to the masked threshold, generating an audio quality estimate (152), for example, based upon the differences in levels between the error signal and the masked threshold.

ITU-R BS 1387 describes in greater detail several other quality measures and auditory models. In a FFT-based ear model, reference and test signals at 48 kHz are each split into windows of 2048 samples such that there is 50% overlap across consecutive windows. A Hann window function and FFT are applied, and the resulting frequency coefficients are filtered to model the filtering effects of the outer and middle ear. An error signal is calculated as the difference between the frequency coefficients of the reference signal and those of the test signal. For each of the error signal, the reference signal, and the test signal, the energy is calculated by squaring the signal values. The energies are then mapped to critical bands/pitches. For each critical band, the energies of the coefficients contributing to (e.g., within) that critical band are added together. For the reference signal and the test signal, the energies for the critical bands are then smeared across frequencies and time to model simultaneous and temporal masking. The outputs of the smearing are called excitation patterns. A masking threshold can then be calculated for an excitation pattern:

$$M[k,n]=\frac{E[k,n]}{10^{\frac{m[k]}{10}}}, \tag{2}$$

for m[k]=3.0 if k*res≦12 and m[k]=k*res if k*res>12, where k is the critical band, res is the resolution of the band scale in terms of Bark bands, n is the frame, and E[k,n] is the excitation pattern.

From the excitation patterns, error signal, and other outputs of the ear model, ITU-R BS 1387 describes calculating Model Output Variables ["MOVs"]. One MOV is the average noise to mask ratio ["NMR"] for a frame:

$$NMR_{local}[n]=10*\log_{10}\frac{1}{Z}\sum_{k=0}^{Z-1}\frac{P_{noise}[k,n]}{M[k,n]}, \tag{3}$$

where n is the frame number, Z is the number of critical bands per frame, $P_{noise}$ [k,n] is the noise pattern, and M[k,n] is the masking threshold. NMR can also be calculated for a whole signal as a combination of NMR values for frames.

In ITU-R BS 1387, NMR and other MOVs are weighted and aggregated to give a single output quality value. The weighting ensures that the single output value is consistent with the results of subjective listening tests. For stereo signals, the linear average of MOVs for the left and right channels is taken. For more information about the FFT-based ear model and calculation of NMR and other MOVs, see ITU-R BS 1387, Annex 2, Sections 2.1 and 4–6. ITU-R BS 1387 also describes a filter bank-based ear model. The Beerends reference also describes audio quality measurement, as does Solari, *Digital Video and Audio Compression*, "Chapter 8: Sound and Audio," McGraw-Hill, Inc., pp. 187–212 (1997).

Compared to subjective listening tests, the techniques described in ITU-R BS 1387 are more consistent and reproducible. Nonetheless, the techniques have several shortcomings. First, the techniques are complex and time-consuming, which limits their usefulness for real-time applications. For example, the techniques are too complex to be used effectively in a quantization loop in an audio encoder. Second, the NMR of ITU-R BS 1387 measures perceptible degradation compared to the masking threshold for the original signal, which can inaccurately estimate the perceptible degradation for a listener of the reconstructed signal. For example, the masking threshold of the original signal can be higher or lower than the masking threshold of the reconstructed signal due to the effects of quantization. A masking component in the original signal might not even be present in the reconstructed signal. Third, the NMR of ITU-R BS 1387 fails to adequately weight NMR on a per-band basis, which limits its usefulness and adaptability. Aside from these shortcomings, the techniques described in ITU-R BS 1387 present several practical problems for an audio encoder. The techniques presuppose input at a fixed rate (48 kHz). The techniques assume fixed transform block sizes, and use a transform and window function (in the FFT-based ear model) that can be different than the transform used in the encoder, which is inefficient. Finally, the number of quantization bands used in the encoder is not necessarily equal to the number of critical bands in an auditory model of ITU-R BS 1387.

Microsoft Corporation's Windows Media Audio version 7.0 ["WMA7"] partially addresses some of the problems with implementing quality measurement in an audio encoder. In WMA7, the encoder may jointly code the left and right channels of stereo mode audio data into a sum channel and a difference channel. The sum channel is the averages of the left and right channels; the difference channel is the differences between the left and right channels divided by two. The encoder calculates a noise signal for each of the sum channel and the difference channel, where the noise signal is the difference between the original channel and the reconstructed channel. The encoder then calculates the maximum Noise to Excitation Ratio ["NER"] of all quantization bands in the sum channel and difference channel:

$$NER_{\max ofalld} = \max\left(\max_d\left(\frac{F_{Diff}[d]}{E_{Diff}[d]}\right), \max_d\left(\frac{F_{Sum}[d]}{E_{Sum}[d]}\right)\right), \quad (4)$$

where d is the quantization band number, $\max_d$ is the maximum value across all d, and $E_{Diff}[d]$, $E_{Sum}[d]$, $F_{Diff}[d]$, and $F_{Sum}[d]$ are the excitation pattern for the difference channel, the excitation pattern for the sum channel, the noise pattern of the difference channel, and the noise pattern of the sum channel, respectively, for quantization bands. In WMA7, calculating an excitation or noise pattern includes squaring values to determine energies, and then, for each quantization band, adding the energies of the coefficients within that quantization band. If WMA7 does not use jointly coded channels, the same equation is used to measure the quality of left and right channels. That is, $$NER_{\max ofalld} = \max\left(\max_d\left(\frac{F_{Left}[d]}{E_{Leftf}[d]}\right), \max_d\left(\frac{F_{Right}[d]}{E_{Right}[d]}\right)\right). \quad (5)$$

WMA7 works in real time and measures audio quality for input with rates other than 48 kHz. WMA7 uses a MLT with variable transform block sizes, and measures audio quality using the same frequency coefficients used in compression. WMA7 does not address several of the problems of ITU-R BS 1387, however, and WMA7 has several other shortcomings as well, each of which decreases the accuracy of the measurement of perceptual audio quality. First, although the quality measurement of WMA7 is simple enough to be used in a quantization loop of the audio encoder, it does not adequately correlate with actual human perception. As a result, changes in quality in order to keep constant bitrate can be dramatic and perceptible. Second, the NER of WMA7 measures perceptible degradation compared to the excitation pattern of the original data (as opposed to reconstructed data), which can inaccurately estimate perceptible degradation for a listener of the reconstructed signal. Third, the NER of WMA7 fails to adequately weight NER on a per-band basis, which limits its usefulness and adaptability. Fourth, although WMA7 works with variable-size transform blocks, WMA7 is unable perform operations such as temporal masking between blocks due to the variable sizes. Fifth, WMA7 measures quality with respect to excitation and noise patterns for quantization bands, which are not necessarily related to a model of human perception with critical bands, and which can be different in different variable-size blocks, preventing comparisons of results. Sixth, WMA7 measures the maximum NER for all quantization bands of a channel, which can inappropriately ignore the contribution of NER s for other quantization bands. Seventh, WMA7 applies the same quality measurement techniques whether independently or jointly coded channels are used, which ignores differences between the two channel modes.

Aside from WMA7, several international standards describe audio encoders that incorporate an auditory model. The Motion Picture Experts Group, Audio Layer 3 ["MP3"] and Motion Picture Experts Group 2, Advanced Audio Coding ["AAC"] standards each describe techniques for measuring distortion in a reconstructed audio signal against thresholds set with an auditory model.

In MP3, the encoder incorporates a psychoacoustic model to calculate Signal to Mask Ratios ["SMRs"] for frequency ranges called threshold calculation partitions. In a path separate from the rest of the encoder, the encoder processes the original audio data according to the psychoacoustic model. The psychoacoustic model uses a different frequency transform than the rest of the encoder (FFT vs. hybrid polyphase/MDCT filter bank) and uses separate computations for energy and other parameters. In the psychoacoustic model, the MP3 encoder processes blocks of frequency coefficients according to the threshold calculation partitions, which have sub-Bark band resolution (e.g., 62 partitions for a long block of 48 kHz input). The encoder calculates a SMR for each partition. The encoder converts the SMRs for the partitions into SMRs for scale factor bands. A scale factor band is a range of frequency coefficients for which the encoder calculates a weight called a scale factor. The number of scale factor bands depends on sampling rate and block size (e.g., 21 scale factor bands for a long block of 48 kHz input). The encoder later converts the SMRs for the scale factor bands into allowed distortion thresholds for the scale factor bands.

In an outer quantization loop, the MP3 encoder compares distortions for scale factor bands to the allowed distortion thresholds for the scale factor bands. Each scale factor starts with a minimum weight for a scale factor band. For the starting set of scale factors, the encoder finds a satisfactory quantization step size in an inner quantization loop. In the outer quantization loop, the encoder amplifies the scale factors until the distortion in each scale factor band is less than the allowed distortion threshold for that scale factor band, with the encoder repeating the inner quantization loop for each adjusted set of scale factors. In special cases, the encoder exits the outer quantization loop even if distortion exceeds the allowed distortion threshold for a scale factor band (e.g., if all scale factors have been amplified or if a scale factor has reached a maximum amplification).

Before the quantization loops, the MP3 encoder can switch between long blocks of 576 frequency coefficients and short blocks of 192 frequency coefficients (sometimes called long windows or short windows). Instead of a long block, the encoder can use three short blocks for better time resolution. The number of scale factor bands is different for short blocks and long blocks (e.g., 12 scale factor bands vs. 21 scale factor bands). The MP3 encoder runs the psychoacoustic model twice (in parallel, once for long blocks and once for short blocks) using different techniques to calculate SMR depending on the block size.

The MP3 encoder can use any of several different coding channel modes, including single channel, two independent channels (left and right channels), or two jointly coded channels (sum and difference channels). If the encoder uses jointly coded channels, the encoder computes a set of scale factors for each of the sum and difference channels using the same techniques that are used for left and right channels. Or, if the encoder uses jointly coded channels, the encoder can instead use intensity stereo coding. Intensity stereo coding changes how scale factors are determined for higher frequency scale factor bands and changes how sum and difference channels are reconstructed, but the encoder still computes two sets of scale factors for the two channels.

For additional information about MP3 and AAC, see the MP3 standard ("ISO/IEC 11172-3, Information Technology—Coding of Moving Pictures and Associated Audio for Digital Storage Media at Up to About 1.5 Mbit/s—Part 3: Audio") and the AAC standard.

Although MP3 encoding has achieved widespread adoption, it is unsuitable for some applications (for example, real-time audio streaming at very low to mid bitrates) for several reasons. First, calculating SMRs and allowed distortion thresholds with MP3's psychoacoustic model occurs outside of the quantization loops. The psychoacoustic model is too complex for some applications, and cannot be integrated into a quantization loop for such applications. At the same time, as the psychoacoustic model is outside of the quantization loops, it works with original audio data (as opposed to reconstructed audio data), which can lead to inaccurate estimation of perceptible degradation for a listener of the reconstructed signal at lower bitrates. Second, the MP3 encoder fails to adequately weight SMRs and allowed distortion thresholds on a per-band basis, which limits the usefulness and adaptability of the MP3 encoder. Third, computing SMRs and allowed distortion thresholds in separate tracks for long blocks and short blocks prevents or complicates operations such as temporal spreading or comparing measures for blocks of different sizes. Fourth, the MP3 encoder does not adequately exploit differences between independently coded channels and jointly coded channels when calculating SMRs and allowed distortion thresholds.

SUMMARY

The present invention relates to measurement of perceptual audio quality. The quality measurement is fast enough to be used in a quantization loop of an audio encoder. At the same time, the quality measurement incorporates an auditory model, so the measurements correlate well with subjective audio quality measurements.

The quality measurement of the present invention includes various techniques and tools, which can be used in combination or independently.

According to a first aspect of the quality measurement, in a quantization loop, an audio encoder reconstructs a block of spectral data quantized by quantization band. The encoder processes the reconstructed block by critical band according to an auditory model and then measures quality of the reconstructed block. The quantization bands can differ from the critical bands in terms of number or position of bands, so the auditory model can improve the accuracy of the quality measurement even as the encoder selects quantization bands for efficient representation of a quantization matrix.

According to a second aspect of the quality measurement, blocks of data having variable size are normalized before computing quality measures for the blocks. The normalization facilitates comparison of quality measures between blocks and improves auditory modeling by enabling temporal smearing.

According to a third aspect of the quality measurement, an effective masking measure is computed based at least in part upon a reconstructed audio masking measure. The effective masking measure can thereby account for suppressed or enhanced levels in reconstructed audio relative to the original audio, which improves estimation of perceptible degradation for someone listening to the reconstructed audio.

According to a fourth aspect of the quality measurement, an encoder band weights a quality measure, which improves the flexibiltiy and adaptability of the encoder. Band weights can differ from block to block to account for, for example, different block sizes, audio patterns, or user input. Band weights can also account for noise substitution, band truncation, or other techniques used in the encoder which improve performance but do not integrate well with a quality measurement technique.

According to a fifth aspect of the quality measurement, quality measurement occurs in channel mode-dependent manner. For example, an audio encoder changes the band weighting technique used for quality measurement depending on whether stereo mode data is in independently coded channels or in jointly coded channels.

Additional features and advantages of the invention will be made apparent from the following detailed description of an illustrative embodiment that proceeds with reference to the accompanying drawings.

BRIEF DESCRIPTION OF THE DRAWINGS

FIG. 1 is a diagram of a masked threshold approach to measuring audio quality according to the prior art.

FIG. 2 is a block diagram of a suitable computing environment in which the illustrative embodiment may be implemented.

DETAILED DESCRIPTION

Figure 3:
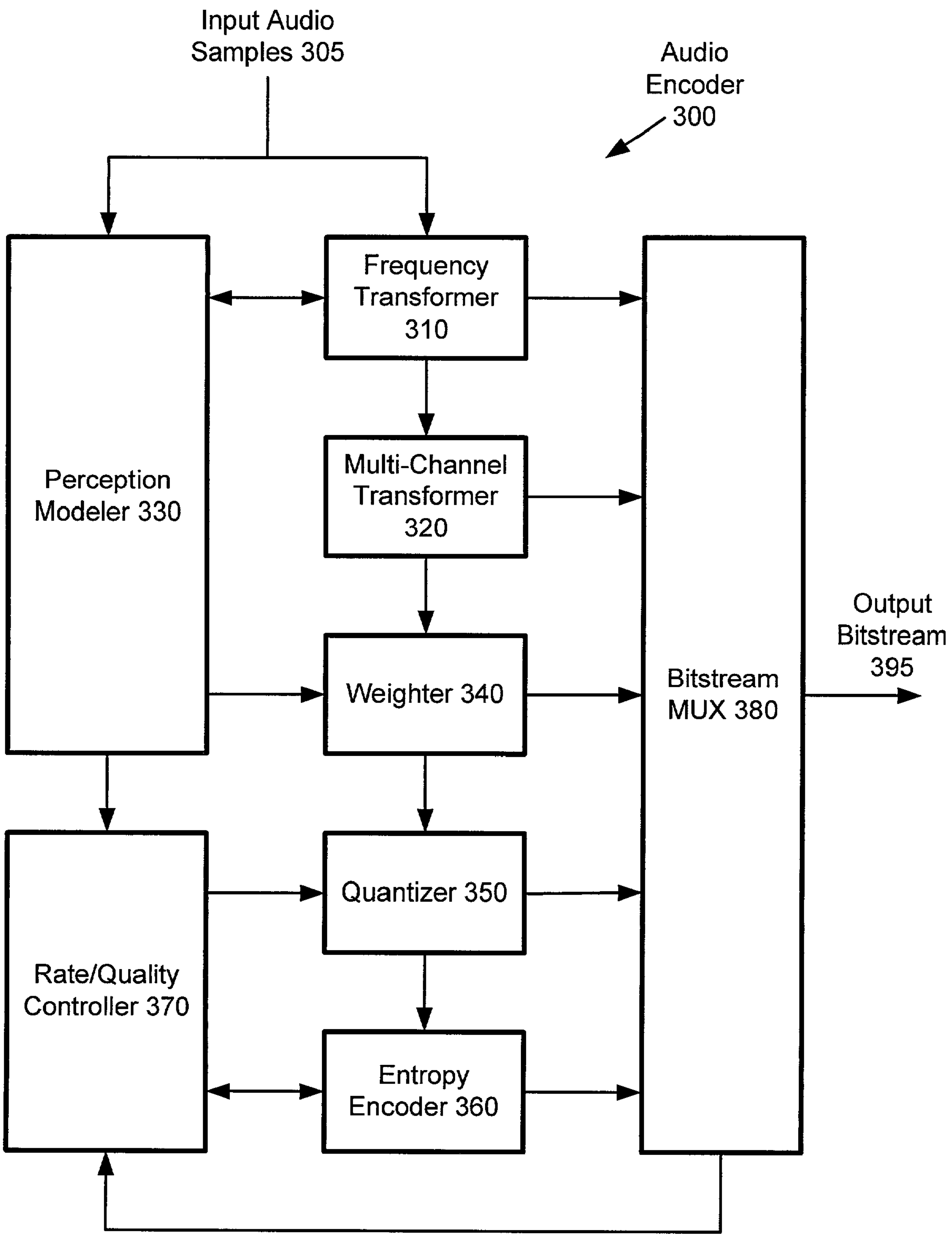
FIG. 3 is a block diagram of a generalized audio encoder according to the illustrative embodiment.

The illustrative embodiment of the present invention is directed to an audio encoder that measures perceived audio quality. The measurement is fast enough to be used in the quantization loop of the audio encoder, and also correlates well with actual human perception. As a result, the audio encoder can smoothly vary quality and bitrate, reducing the number of dramatic, perceptible quality changes.

The audio encoder uses several techniques to measure perceived audio quality accurately and quickly. While the techniques are typically described herein as part of a single, integrated system, the techniques can be applied separately in audio quality measurement, potentially in combination with other quality measurement techniques.

In the illustrative embodiment, an audio encoder measures audio quality. In alternative embodiments, an audio decoder or other audio processing tool implements one or more of the techniques for measuring audio quality.

I. Computing Environment

FIG. 2 illustrates a generalized example of a suitable computing environment (200) in which the illustrative embodiment may be implemented. The computing environment (200) is not intended to suggest any limitation as to scope of use or functionality of the invention, as the present invention may be implemented in diverse general-purpose or special-purpose computing environments.

With reference to FIG. 2, the computing environment (200) includes at least one processing unit (210) and memory (220). In FIG. 2, this most basic configuration (230) is included within a dashed line. The processing unit (210) executes computer-executable instructions and may be a real or a virtual processor. In a multi-processing system, multiple processing units execute computer-executable instructions to increase processing power. The memory (220) may be volatile memory (e.g., registers, cache, RAM), non-volatile memory (e.g., ROM, EEPROM, flash memory, etc.), or some combination of the two. The memory (220) stores software (280) implementing an audio encoder that measures perceptual audio quality.

A computing environment may have additional features. For example, the computing environment (200) includes storage (240), one or more input devices (250), one or more output devices (260), and one or more communication connections (270). An interconnection mechanism (not shown) such as a bus, controller, or network interconnects the components of the computing environment (200). Typically, operating system software (not shown) provides an operating environment for other software executing in the computing environment (200), and coordinates activities of the components of the computing environment (200).

The storage (240) may be removable or non-removable, and includes magnetic disks, magnetic tapes or cassettes, CD-ROMs, CD-RWs, DVDs, or any other medium which can be used to store information and which can be accessed within the computing environment (200). The storage (240) stores instructions for the software (280) implementing the audio encoder that measures perceptual audio quality.

The input device(s) (250) may be a touch input device such as a keyboard, mouse, pen, or trackball, a voice input device, a scanning device, or another device that provides input to the computing environment (200). For audio, the input device(s) (250) may be a sound card or similar device that accepts audio input in analog or digital form, or a CD-ROM reader that provides audio samples to the computing environment. The output device(s) (260) may be a display, printer, speaker, CD-writer, or another device that provides output from the computing environment (200).

The communication connection(s) (270) enable communication over a communication medium to another computing entity. The communication medium conveys information such as computer-executable instructions, compressed audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The invention can be described in the general context of computer-readable media. Computer-readable media are any available media that can be accessed within a computing environment. By way of example, and not limitation, with the computing environment (200), computer-readable media include memory (220), storage (240), communication media, and combinations of any of the above.

The invention can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "determine," "generate," "adjust," and "apply" to describe computer operations in a computing environment. These terms are high-level abstractions for operations performed by a computer, and should not be confused with acts performed by a human being. The actual computer operations corresponding to these terms vary depending on implementation.

II. Generalized Audio Encoder and Decoder

Figure 4:
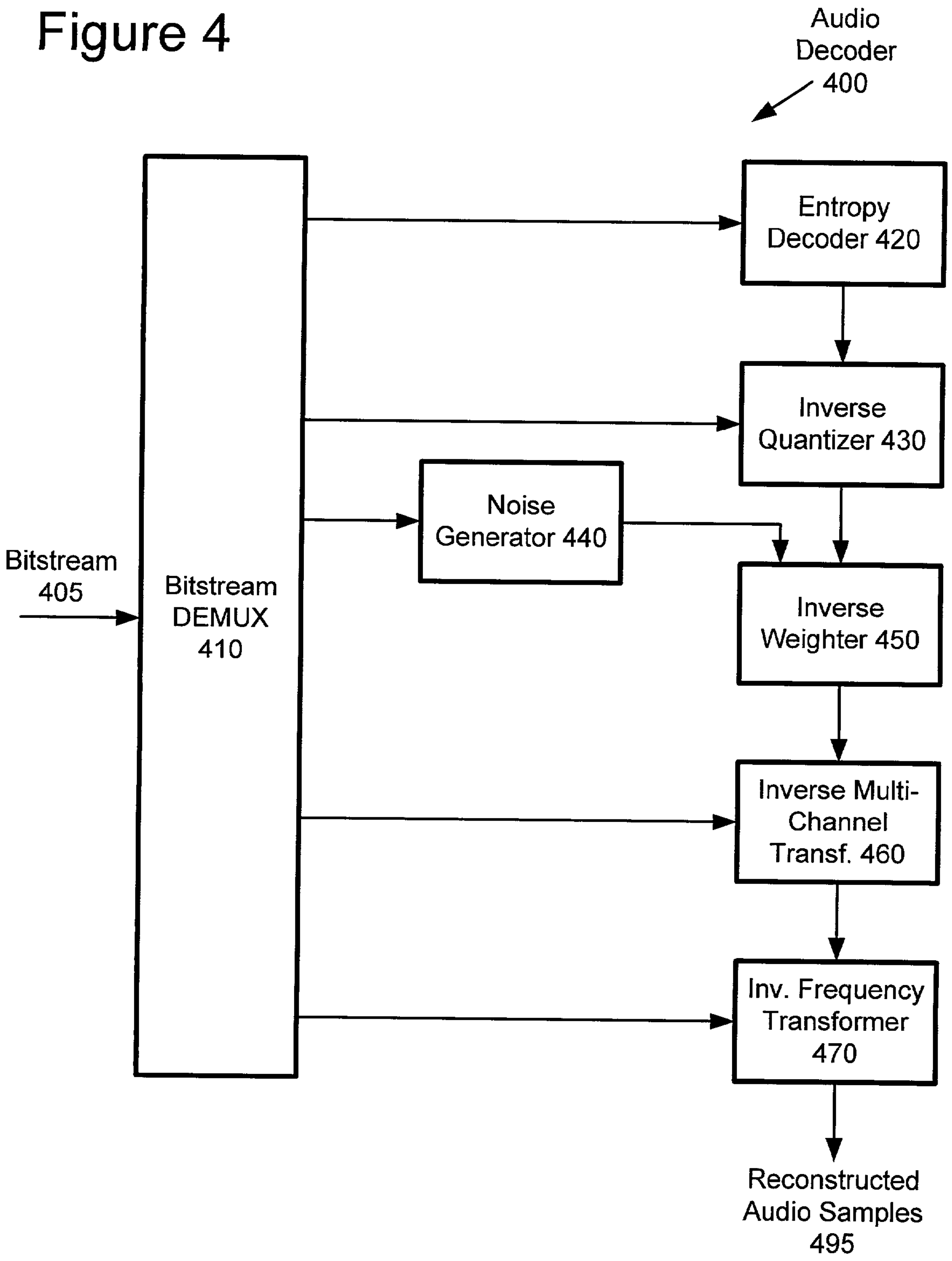
FIG. 4 is a block diagram of a generalized audio decoder according to the illustrative embodiment.

FIG. 3 is a block diagram of a generalized audio encoder (300). The encoder (300) measures the perceptual quality of an audio signal and adaptively adjusts quantization of the audio signal based upon the measured quality. This helps ensure that variations in quality are smooth over time. FIG. 4 is a block diagram of a generalized audio decoder (400).

The relationships shown between modules within the encoder and decoder indicate the main flow of information in the encoder and decoder; other relationships are not shown for the sake of simplicity. Depending on implementation and the type of compression desired, modules of the encoder or decoder can be added, omitted, split into multiple modules, combined with other modules, and/or replaced with like modules. In alternative embodiments, encoders or decoders with different modules and/or other configurations of modules measure perceptual audio quality.

A. Generalized Audio Encoder

The generalized audio encoder (300) includes a frequency transformer (310), a multi-channel transformer (320), a perception modeler (330), a weighter (340), a quantizer (350), an entropy encoder (360), a rate/quality controller (370), and a bitstream multiplexer ["MUX"] (380).

The encoder (300) receives a time series of input audio samples (305) in a format such as one shown in Table 1. For input with multiple channels (e.g., stereo mode), the encoder (300) processes channels independently, and can work with jointly coded channels following the multi-channel transformer (320). The encoder (300) compresses the audio samples (305) and multiplexes information produced by the various modules of the encoder (300) to output a bitstream (395) in a format such as Windows Media Audio ["WMA"] or Advanced Streaming Format ["ASF"]. Alternatively, the encoder (300) works with other input and/or output formats.

The frequency transformer (310) receives the audio samples (305) and converts them into data in the frequency domain. The frequency transformer (310) splits the audio samples (305) into blocks, which can have variable size to allow variable temporal resolution. Small blocks allow for greater preservation of time detail at short but active transition segments in the input audio samples (305), but sacrifice some frequency resolution. In contrast, large blocks have better frequency resolution and worse time resolution, and usually allow for greater compression efficiency at longer and less active segments, in part because frame header and side information is proportionally less than in small blocks. Blocks can overlap to reduce perceptible discontinuities between blocks that could otherwise be introduced by later quantization. The frequency transformer (310) outputs blocks of frequency coefficients to the multi-channel transformer (320) and outputs side information such as block sizes to the MUX (380). The frequency transformer (310) outputs both the frequency coefficients and the side information to the perception modeler (330).

In the illustrative embodiment, the frequency transformer (310) partitions a frame of audio input samples (305) into overlapping sub-frame blocks with time-varying size and applies a time-varying MLT to the sub-frame blocks. Possible sub-frame sizes include 256, 512, 1024, 2048, and 4096 samples. The MLT operates like a DCT modulated by a time window function, where the window function is time varying and depends on the sequence of sub-frame sizes. The MLT transforms a given overlapping block of samples $x[n], 0 \leqq n < subframe\_size$ into a block of frequency coefficients $X[k], 0 \leqq k < subframe\_size/2$. The frequency transformer (310) can also output estimates of the transient strengths of samples in the current and future frames to the rate/quality controller (370). Alternative embodiments use other varieties of MLT. In still other alternative embodiments, the frequency transformer (310) applies a DCT, FFT, or other type of modulated or non-modulated, overlapped or non-overlapped frequency transform, or use subband or wavelet coding.

For multi-channel audio data, the multiple channels of frequency coefficient data produced by the frequency transformer (310) often correlate. To exploit this correlation, the multi-channel transformer (320) can convert the multiple original, independently coded channels into jointly coded channels. For example, if the input is stereo mode, the multi-channel transformer (320) can convert the left and right channels into sum and difference channels:

$$X_{Sum}[k] = \frac{X_{Left}[k] + X_{Right}[k]}{2}, \quad (6)$$

$$X_{Diff}[k] = \frac{X_{Left}[k] - X_{Right}[k]}{2}. \quad (7)$$

Or, the multi-channel transformer (320) can pass the left and right channels through as independently coded channels. More generally, for a number of input channels greater than one, the multi-channel transformer (320) passes original, independently coded channels through unchanged or converts the original channels into jointly coded channels. The decision to use independently or jointly coded channels can be predetermined, or the decision can be made adaptively on a block by block or other basis during encoding. The multi-channel transformer (320) produces side information to the MUX (380) indicating the channel mode used.

The perception modeler (330) models properties of the human auditory system to improve the quality of the reconstructed audio signal for a given bitrate. The perception modeler (330) computes the excitation pattern of a variable-size block of frequency coefficients. First, the perception modeler (330) normalizes the size and amplitude scale of the block. This enables subsequent temporal smearing and establishes a consistent scale for quality measures. Optionally, the perception modeler (330) attenuates the coefficients at certain frequencies to model the outer/middle ear transfer function. The perception modeler (330) computes the energy of the coefficients in the block and aggregates the energies in, for example, 25 critical bands. Alternatively, the perception modeler (330) uses another number of critical bands (e.g., 55 or 109). The frequency ranges for the critical bands are implementation-dependent, and numerous options are well known. For example, see ITU-R BS 1387, the MP3 standard, or references mentioned therein. The perception modeler (330) processes the band energies to account for simultaneous and temporal masking. The section entitled "Computing Excitation Patterns" describes this process in more detail. In alternative embodiments, the perception modeler (330) processes the audio data according to a different auditory model, such as one described or mentioned in ITU-R BS 1387 or the MP3 standard.

The weighter (340) generates weighting factors for a quantization matrix based upon the excitation pattern received from the perception modeler (330) and applies the weighting factors to the data received from the multi-channel transformer (320). The weighting factors include a weight for each of multiple quantization bands in the audio data. The quantization bands can be the same or different in number or position from the critical bands used elsewhere in the encoder (300). The weighting factors indicate proportions at which noise is spread across the quantization bands, with the goal of minimizing the audibility of the noise by putting more noise in bands where it is less audible, and vice versa. The weighting factors can vary in amplitudes and number of quantization bands from block to block. In one implementation, the number of quantization bands varies according to block size; smaller blocks have fewer quantization bands than larger blocks. For example, blocks with 128 coefficients have 13 quantization bands, blocks with 256 coefficients have 15 quantization bands, up to 25 quantization bands for blocks with 2048 coefficients. In one implementation, the weighter (340) generates a set of weighting factors for each channel of multi-channel audio data in independently coded channels, or generates a single set of weighting factors for jointly coded channels. In alternative embodiments, the weighter (340) generates the weighting factors from information other than or in addition to excitation patterns. Instead of applying the weighting factors, the weighter (340) can pass the weighting factors to the quantizer (350) for application in the quantizer (350).

The weighter (340) outputs weighted blocks of coefficient data to the quantizer (350) and outputs side information such as the set of weighting factors to the MUX (380). The weighter (340) can also output the weighting factors to the rate/quality controller (370) or other modules in the encoder (300). The set of weighting factors can be compressed for more efficient representation. If the weighting factors are lossy compressed, the reconstructed weighting factors are typically used to weight the blocks of coefficient data. If audio information in a band of a block is completely eliminated for some reason (e.g., noise substitution or band truncation), the encoder (300) may be able to further improve the compression of the quantization matrix for the block.

The quantizer (350) quantizes the output of the weighter (340), producing quantized coefficient data to the entropy encoder (360) and side information including quantization step size to the MUX (380). Quantization introduces irreversible loss of information, but also allows the encoder (300) to regulate the quality and bitrate of the output bitstream (395) in conjunction with the rate/quality controller (370). In FIG. 3, the quantizer (350) is an adaptive, uniform, scalar quantizer. The quantizer (350) applies the same quantization step size to each frequency coefficient, but the quantization step size itself can change from one iteration of a quantization loop to the next to affect the bitrate of the entropy encoder (360) output. In alternative embodiments, the quantizer is a non-uniform quantizer, a vector quantizer, and/or a non-adaptive quantizer.

The entropy encoder (360) losslessly compresses quantized coefficient data received from the quantizer (350). For example, the entropy encoder (360) uses multi-level run length coding, variable-to-variable length coding, run length coding, Huffman coding, dictionary coding, arithmetic coding, LZ coding, a combination of the above, or some other entropy encoding technique. The entropy encoder (360) can compute the number of bits spent encoding audio information and pass this information to the rate/quality controller (370).

The rate/quality controller (370) works with the quantizer (350) to regulate the bitrate and quality of the output of the encoder (300). The rate/quality controller (370) receives information from other modules of the encoder (300). In one implementation, the rate/quality controller (370) receives 1) transient strengths from the frequency transformer (310), 2) sampling rate, block size information, and the excitation pattern of original audio data from the perception modeler (330), 3) weighting factors from the weighter (340), 4) a block of quantized audio information in some form (e.g., quantized, reconstructed), 5) bit count information for the block, and 6) buffer status information from the MUX (380). The rate/quality controller (370) can include an inverse quantizer, an inverse weighter, an inverse multi-channel transformer, and potentially other modules to reconstruct the audio information or compute information about the block.

The rate/quality controller (370) processes the received information to determine a desired quantization step size given current conditions. The rate/quality controller (370) outputs the quantization step size to the quantizer (350). The rate/quality controller (370) measures the quality of a block of reconstructed audio data as quantized with the quantization step size, as described below. Using the measured quality as well as bitrate information, the rate/quality controller (370) adjusts the quantization step size with the goal of satisfying bitrate and quality constraints, both instantaneous and long-term. In alternative embodiments, the rate/quality controller (370) works with different or additional information, or applies different techniques to regulate quality and/or bitrate.

The encoder (300) can apply noise substitution, band truncation, and/or multi-channel rematrixing to a block of audio data. At low and mid-bitrates, the audio encoder (300) can use noise substitution to convey information in certain bands, as described below in the section entitled, "Computing Weights for Noise to Excitation Ratio." In band truncation, if the measured quality for a block indicates poor quality, the encoder (300) can completely eliminate the coefficients in certain (usually higher frequency) bands to improve the overall quality in the remaining bands. In multi-channel rematrixing, for low bitrate, multi-channel audio data in jointly coded channels, the encoder (300) can suppress information in certain channels (e.g., the difference channel) to improve the quality of the remaining channel(s) (e.g., the sum channel).

The MUX (380) multiplexes the side information received from the other modules of the audio encoder (300) along with the entropy encoded data received from the entropy encoder (360). The MUX (380) outputs the information in WMA format or another format that an audio decoder recognizes.

The MUX (380) includes a virtual buffer that stores the bitstream (395) to be output by the encoder (300). The virtual buffer stores a pre-determined duration of audio information (e.g., 5 seconds for streaming audio) in order to smooth over short-term fluctuations in bitrate due to complexity changes in the audio. The virtual buffer then outputs data at a relatively constant bitrate. The current fullness of the buffer, the rate of change of fullness of the buffer, and other characteristics of the buffer can be used by the rate/quality controller (370) to regulate quality and/or bitrate.

B. Generalized Audio Decoder

With reference to FIG. 4, the generalized audio decoder (400) includes a bitstream demultiplexer ["DEMUX"] (410), an entropy decoder (420), an inverse quantizer (430), a noise generator (440), an inverse weighter (450), an inverse multi-channel transformer (460), and an inverse frequency transformer (470). The decoder (400) is simpler than the encoder (300) because the decoder (400) does not include modules for rate/quality control.

The decoder (400) receives a bitstream (405) of compressed audio data in WMA format or another format. The bitstream (405) includes entropy encoded data as well as side information from which the decoder (400) reconstructs audio samples (495). For audio data with multiple channels, the decoder (400) processes each channel independently, and can work with jointly coded channels before the inverse multi-channel transformer (460).

The DEMUX (410) parses information in the bitstream (405) and sends information to the modules of the decoder (400). The DEMUX (410) includes one or more buffers to compensate for short-term variations in bitrate due to fluctuations in complexity of the audio, network jitter, and/or other factors.

The entropy decoder (420) losslessly decompresses entropy codes received from the DEMUX (410), producing quantized frequency coefficient data. The entropy decoder (420) typically applies the inverse of the entropy encoding technique used in the encoder.

The inverse quantizer (430) receives a quantization step size from the DEMUX (410) and receives quantized frequency coefficient data from the entropy decoder (420). The inverse quantizer (430) applies the quantization step size to the quantized frequency coefficient data to partially reconstruct the frequency coefficient data. In alternative embodiments, the inverse quantizer applies the inverse of some other quantization technique used in the encoder.

From the DEMUX (410), the noise generator (440) receives information indicating which bands in a block of data are noise substituted as well as any parameters for the form of the noise. The noise generator (440) generates the patterns for the indicated bands, and passes the information to the inverse weighter (450).

The inverse weighter (450) receives the weighting factors from the DEMUX (410), patterns for any noise-substituted bands from the noise generator (440), and the partially reconstructed frequency coefficient data from the inverse quantizer 430). As necessary, the inverse weighter (450) decompresses the weighting factors. The inverse weighter (450) applies the weighting factors to the partially reconstructed frequency coefficient data for bands that have not been noise substituted. The inverse weighter (450) then adds in the noise patterns received from the noise generator (440) for the noise-substituted bands.

The inverse multi-channel transformer (460) receives the reconstructed frequency coefficient data from the inverse weighter (450) and channel mode information from the DEMUX (410). If multi-channel data is in independently coded channels, the inverse multi-channel transformer (460) passes the channels through. If multi-channel data is in jointly coded channels, the inverse multi-channel transformer (460) converts the data into independently coded channels.

The inverse frequency transformer (470) receives the frequency coefficient data output by the multi-channel transformer (460) as well as side information such as block sizes from the DEMUX (410). The inverse frequency transformer (470) applies the inverse of the frequency transform used in the encoder and outputs blocks of reconstructed audio samples (495).

III. Measuring Audio Quality

According to the illustrative embodiment, an audio encoder quantizes audio data in order to decrease bitrate and measures the quality of the quantized data as part of a quantization loop. The audio encoder adjusts the quantization so as to maintain smooth listening quality while still staying within bitrate constraints.

Figure 5:
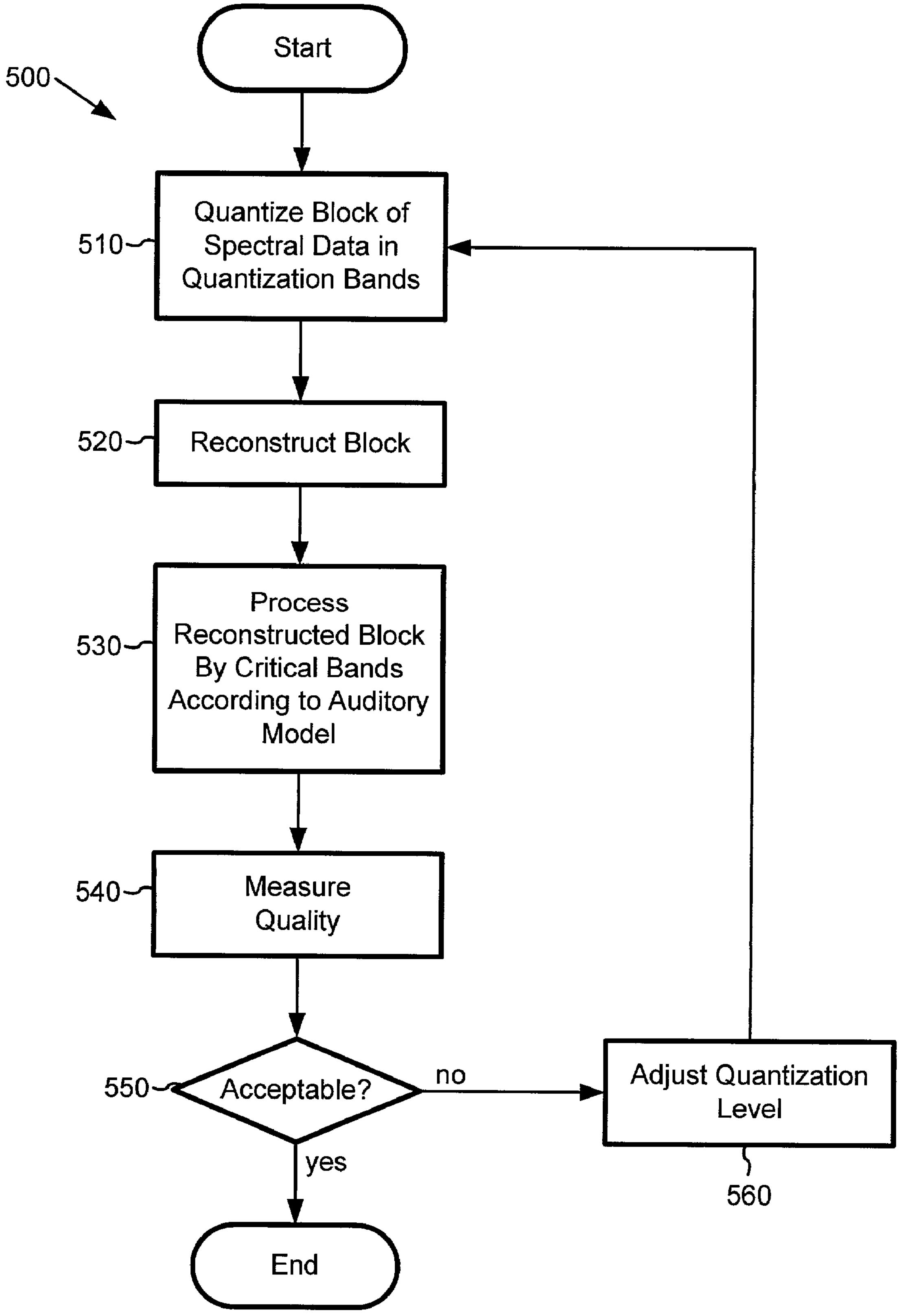
FIG. 5 is a flowchart showing a technique for measuring audio quality in a quantization loop according to the illustrative embodiment.

FIG. 5 shows a quantization loop technique (500) that includes measuring audio quality for a block of spectral data. The measurement is fast enough to be used in a quantization loop each time a new quantization scheme is tested, but also incorporates an accurate auditory model that evaluates the audio data by critical bands. Thus, in some parts of the quantization loop, the block of audio data is processed by quantization bands while in other parts of the quantization loop, the block is processed by critical bands.

Figure 6:
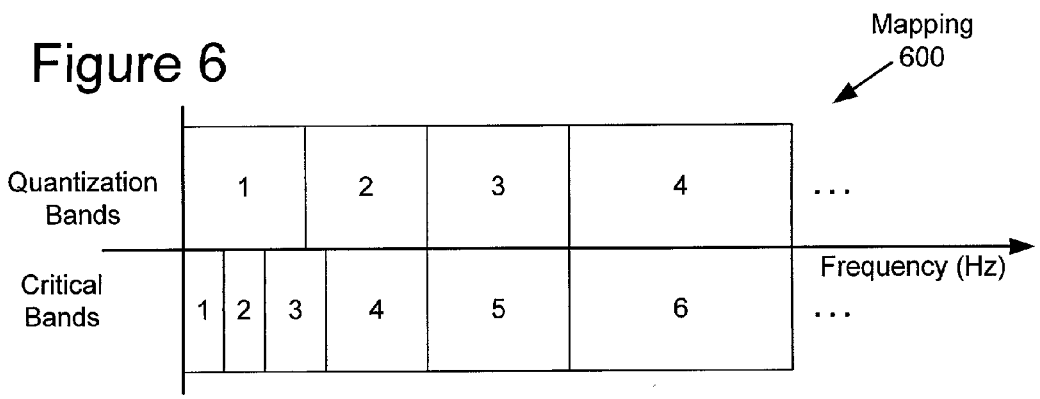
FIG. 6 is a chart showing a mapping of quantization bands to critical bands according to the illustrative embodiment.

To switch between quantization bands and critical bands, the encoder maps quantization bands to critical bands. FIG. 6 shows an example of a mapping (600) between quantization bands and critical bands. The critical bands are determined by an auditory model, while the quantization bands are determined by the encoder for efficient representation of the quantization matrix. The number of quantization bands can be different (typically less) than the number of critical bands, and the band boundaries can be different as well. In one implementation, the number of quantization bands relates to block size. For a block of 2048 frequency coefficients, the number of quantization bands is 25, and each quantization band maps to one of 25 critical bands of the same frequency range. For a block of the 64 frequency coefficients, the number of quantization bands is 13, and some quantization bands map to multiple critical bands.

With reference to FIG. 5, the encoder quantizes (510) a block of spectral data at a level of quantization. For example, the encoder applies a uniform, scalar quantization step size to a block of spectral data that was previously weighted by quantization bands according a quantization matrix. Alternatively, the encoder applies a non-uniform quantization to weight the block by quantization bands, or applies the quantization matrix and the uniform, scalar quantization step size.

The encoder reconstructs (520) the block of spectral data from the quantized data. For example, the encoder applies the inverse of the quantization step size and quantization matrix to the quantized data to reconstruct the block, and then applies an inverse multi-channel transform to return the block to independently coded channels.

The encoder processes (530) the reconstructed block by critical bands according to an auditory model. The number and placement of the critical bands depends on the auditory model, and may be different than the number and placement of quantization bands. By processing the block by critical bands, the encoder improves the accuracy of subsequent quality measurements.

The encoder next measures (540) the quality of the reconstructed block, for example, measuring the noise to excitation ratio as described below. Alternatively, the encoder measures quality with another technique. The encoder can measure quality of the block by critical bands or by quantization bands.

The encoder then determines (550) whether the reconstructed block satisfies current constraints on quality and bitrate. If it does, the level of quantization used to quantize the block is selected as the final level of quantization. If the reconstructed block satisfies quality but not bitrate constraints, the encoder adjusts (560) the level of quantization and quantizes (510) the block with the adjusted level of quantization. For example, the encoder increases the uniform, scalar quantization step size with the goal of decreasing bitrate and then quantizes the block of spectral data previously weighted by the quantization matrix. If the reconstructed block satisfies bitrate but not quality constraints, the encoder can try different levels of quantization to improve quality, but may have to sacrifice quality to stay within bitrate constraints.

Figure 7A:
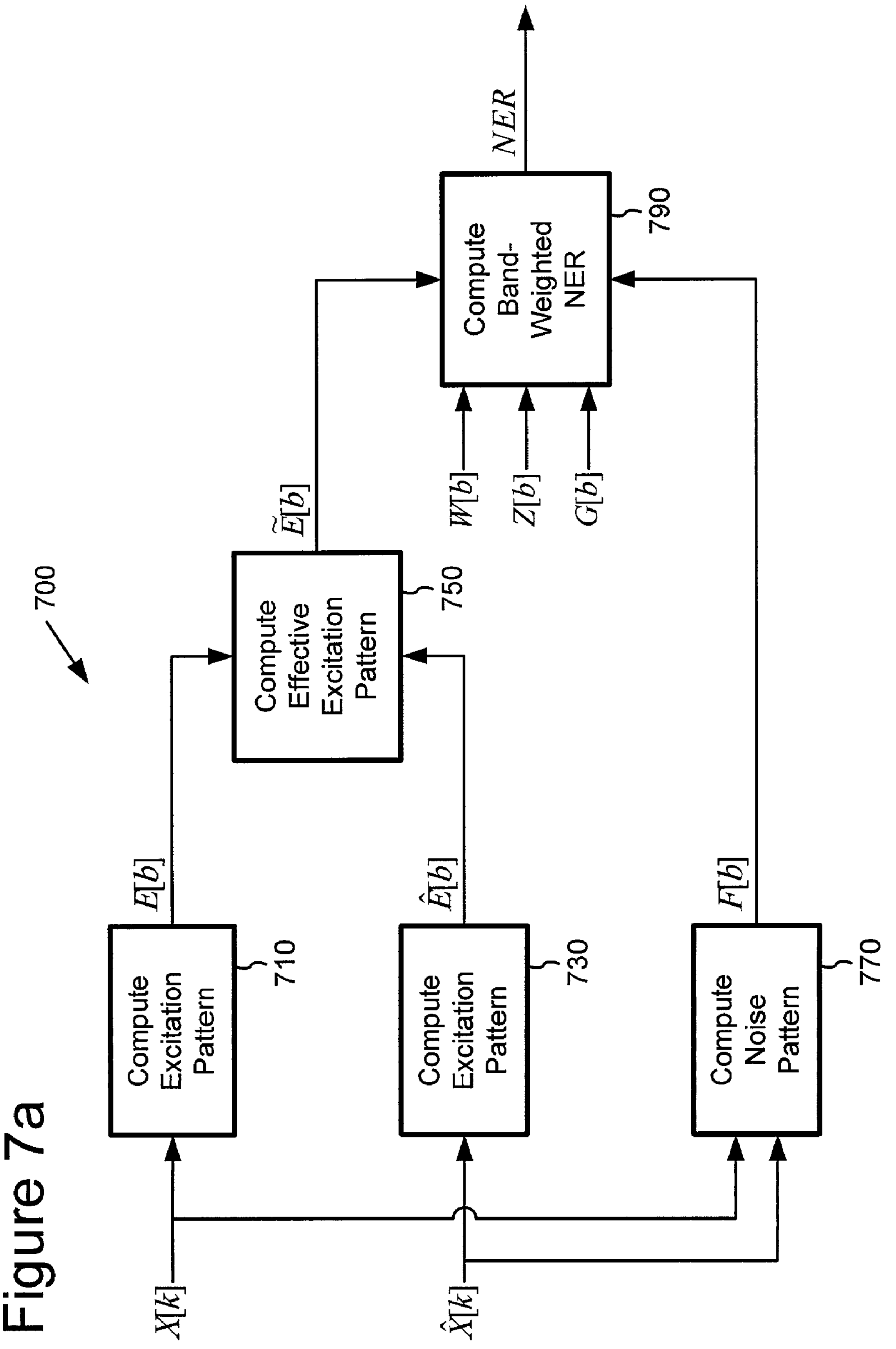
FIGS. 7*a*–7*d* are diagrams showing computation of NER in an audio encoder according to the illustrative embodiment.
Figure 7B:
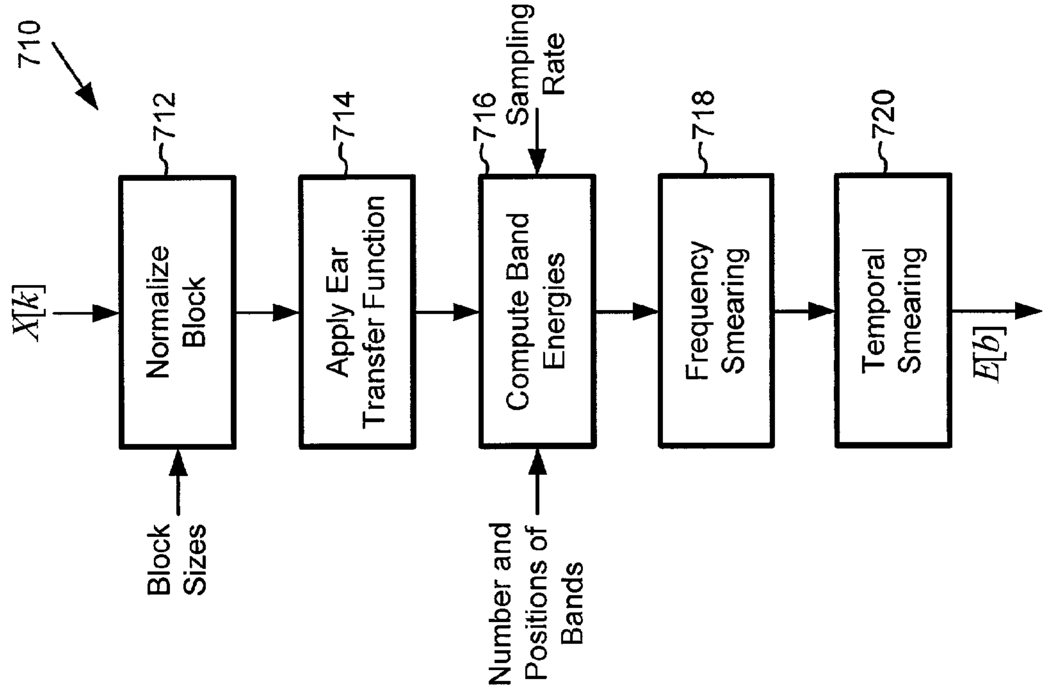
Figure 7C:
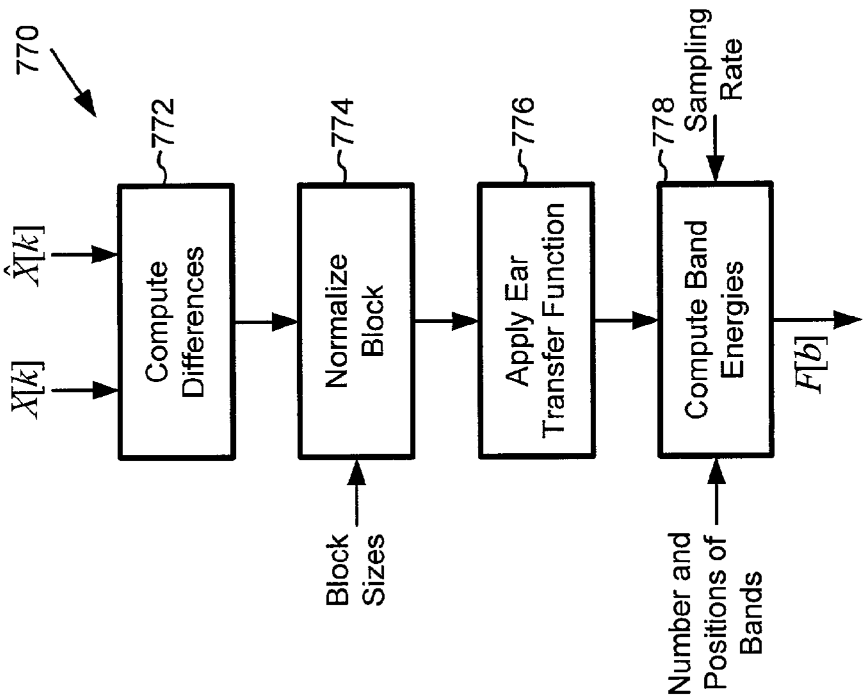
Figure 7D:
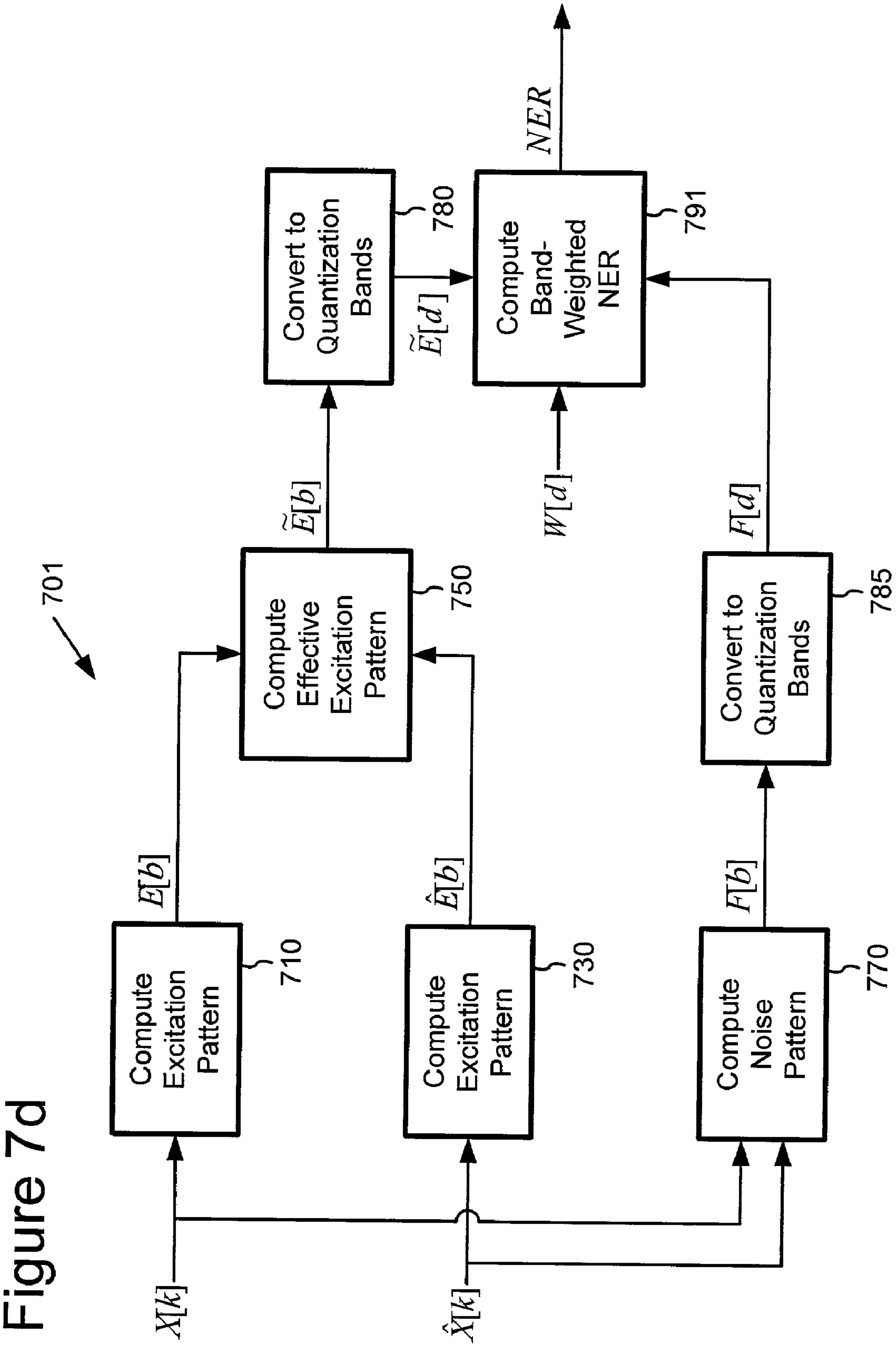

FIGS. 7*a*–7*d* show techniques for computing one particular type of quality measure—Noise to Excitation Ratio ["NER"]. FIG. 7*a* shows a technique (700) for computing NER of a block by critical bands for a single channel. The overall quality measure for the block is a weighted sum of NERs of individual critical bands. FIGS. 7*b* and 7*c* show additional detail for several stages of the technique (700). FIG. 7*d* shows a technique (701) for computing NER of a block by quantization bands.

The inputs to the techniques (700) and (701) include the original frequency coefficients X[k] for the block, the reconstructed coefficients $\hat{X}[k]$ (inverse quantized, inverse weighted, and inverse multi-channel transformed if needed), and one or more weight arrays. The one or more weight arrays can indicate 1) the relative importance of different bands to perception, 2) whether bands are truncated, and/or 3) whether bands are noise-substituted. The one or more weight arrays can be in separate arrays (e.g., W[b], Z[b], G[b]), in a single aggregate array, or in some other combination. FIGS. 7*b* and 7*c* show other inputs such as transform block size (i.e., current window/sub-frame size), maximum block size (i.e., largest time window/frame size), sampling rate, and the number and positions of critical bands.

A. Computing Excitation Patterns

With reference to FIG. 7*a,* the encoder computes (710) the excitation pattern E[b] for the original frequency coefficients X[k] and computes (730) the excitation pattern $\hat{E}[b]$ for the reconstructed frequency coefficients $\hat{X}[k]$ for a block of audio data. The encoder computes the excitations pattern $\hat{E}[b]$ with the same coefficients that are used in compression, using the sampling rate and block sizes used in compression, which makes the process more flexible than the process for computing excitation patterns described in ITU-R BS 1387. In addition, several steps from ITU-R BS 1387 are eliminated (e.g., the adding of internal noise) or simplified to reduce complexity with only a little loss of accuracy.

FIG. 7b shows in greater detail the stage of computing (710) the excitation pattern E[b] for the original frequency coefficients X[k] in a variable-size transform block. To compute (730) $\hat{E}[b]$, the input is $\hat{X}[k]$ instead of X[k], and the process is analogous.

First, the encoder normalizes (712) the block of frequency coefficients X[k],$0 \leqq k<$(subframe_size/2) for a sub-frame, taking as inputs the current sub-frame frame size and the maximum sub-frame size (if not pre-determined in the encoder). The encoder normalizes the size of the block to a standard size by interpolating values between frequency coefficients up to the largest time window/sub-frame size. For example, the encoder uses a zero-order hold technique (i.e., coefficient repetition):

$$Y[k]=\alpha X[k'], \tag{8}$$

$$k' = \text{floor}\left(\frac{k}{\rho}\right), \tag{9}$$

$$\rho = \frac{\text{max\_subframe\_size}}{\text{subframe\_size}}, \tag{10}$$

where Y[k] is the normalized block with interpolated frequency coefficient values, α is an amplitude scaling factor described below, and k' is an index in the block of frequency coefficients. The index k' depends on the interpolation factor ρ, which is the ratio of the largest sub-frame size to the current sub-frame size. If the current sub-frame size is 1024 coefficients and the maximum size is 4096 coefficients, ρ is 4, and for every coefficient from 0–511 in the current transform block (which has a size of $0 \leqq k<$(subframe_size/2)), the normalized block Y[k] includes four consecutive values. Alternatively, the encoder uses other linear or non-linear interpolation techniques to normalize block size.

The scaling factor α compensates for changes in amplitude scale that relate to sub-frame size. In one implementation, the scaling factor is:

$$\alpha = \frac{c}{\text{subframe\_size}}, \tag{11}$$

where c is a constant with a value determined experimentally, for example, c=1.0. Alternatively, other scaling factors can be used to normalize block amplitude scale.

Figure 8:
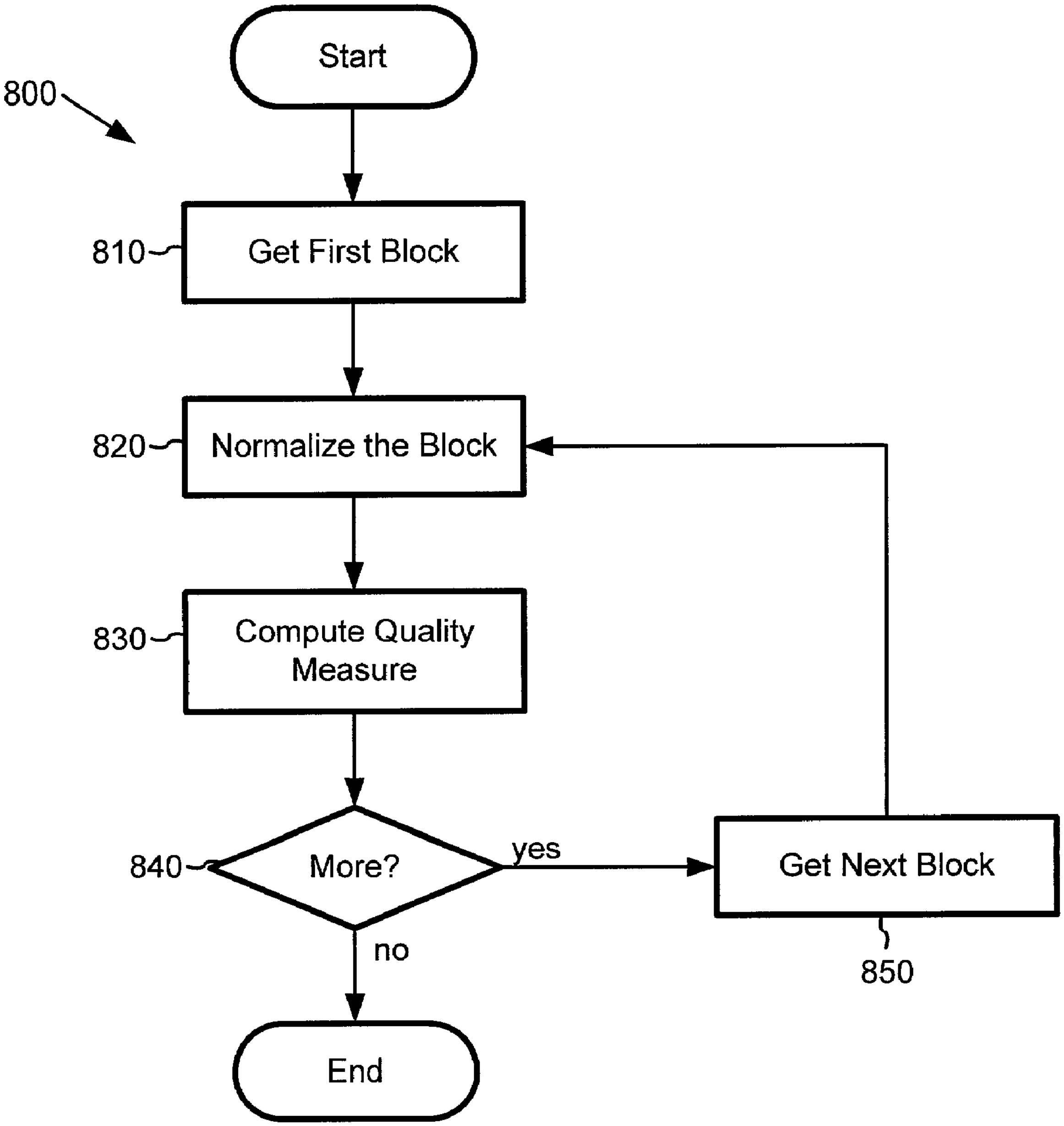
FIG. 8 is a flowchart showing a technique for measuring the quality of a normalized block of audio data according to the illustrative embodiment.

FIG. 8 shows a technique (800) for measuring the audio quality of normalized, variable-size blocks in a broader context than FIGS. 7a through 7d. A tool such as an audio encoder gets (810) a first variable-size block and normalizes (820) the variable-size block. The variable-size block is, for example, a variable-size transform block of frequency coefficients. The normalization can include block size normalization as well as amplitude scale normalization, and enables comparisons and operations between different variable-size blocks.

Next, the tool computes (830) a quality measure for the normalized block. For example, the tool computes NER for the block.

If the tool determines (840) that there are no more blocks to measure quality for, the technique ends. Otherwise, the tool gets (850) the next block and repeats the process. For the sake of simplicity, FIG. 8 does not show repeated computation of the quality measure (as in a quantization loop) or other ways in which the technique (800) can be used in conjunction with other techniques.

Returning to FIG. 7b, after normalizing (712) the block, the encoder optionally applies (714) an outer/middle ear transfer function to the normalized block.

$$Y[k] \leftarrow A[k] \cdot Y[k]. \tag{12}$$

Figure 9:
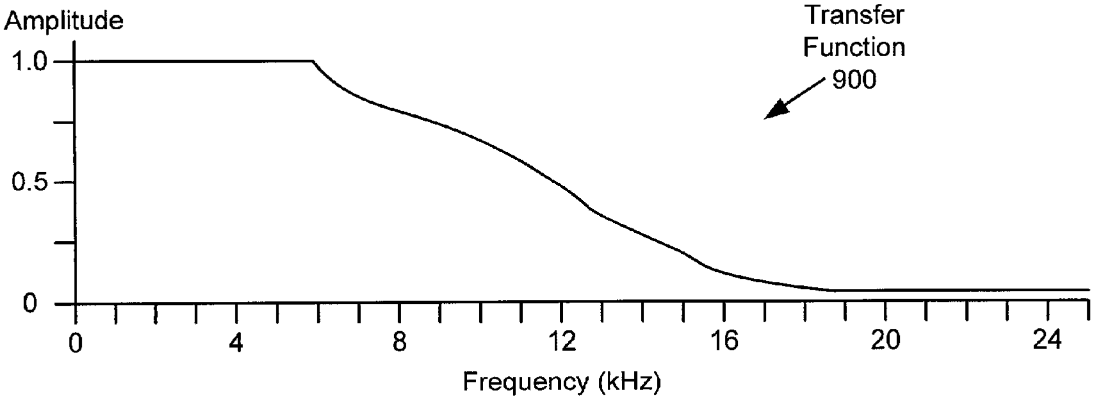
FIG. 9 is a graph of an outer/middle ear transfer function according to the illustrative embodiment.

Modeling the effects of the outer and middle ear on perception, the function A[k] generally preserves coefficients at lower and middle frequencies and attenuates coefficients at higher frequencies. FIG. 9 shows an example of a transfer function (900) used in one implementation. Alternatively, a transfer function of another shape is used. The application of the transfer function is optional. In particular, for high bitrate applications, the encoder preserves fidelity at higher frequencies by not applying the transfer function.

The encoder next computes (716) the band energies for the block, taking as inputs the normalized block of frequency coefficients Y[k], the number and positions of the bands, the maximum sub-frame size, and the sampling rate. (Alternatively, one or more of the band inputs, size, or sampling rate is predetermined.) Using the normalized block Y[k], the energy within each critical band b is accumulated:

$$E[b] = \sum_{k \in B[b]} Y^2[k], \tag{13}$$

where B[b] is a set of coefficient indices that represent frequencies within critical band b. For example, if the critical band b spans the frequency range $[f_l, f_h)$, the set B[b] can be given as:

$$B[b] = \left\{k \middle| k \cdot \frac{\text{samplingrate}}{\text{max\_subframe\_size}} \geq f_l \text{ AND } k \cdot \frac{\text{samplingrate}}{\text{max\_subframe\_size}} < f_h\right\}. \tag{14}$$

So, if the sampling rate is 44.1 kHz and the maximum sub-frame size is 4096 samples, the coefficient indices 38 through 47 (of 0 to 2047) fall within a critical band that runs from 400 up to but not including 510. The frequency ranges $[f_l, f_h)$ for the critical bands are implementation-dependent, and numerous options are well known. For example, see ITU-R BS 1387, the MP3 standard, or references mentioned therein.

Next, also in optional stages, the encoder smears the energies of the critical bands in frequency smearing (718) between critical bands in the block and temporal smearing (720) from block to block. The normalization of block sizes facilitates and simplifies temporal smearing between variable-size transform blocks. The frequency smearing (718) and temporal smearing (720) are also implementation-dependent, and numerous options are well known. For example, see ITU-R BS 1387, the MP3 standard, or references mentioned therein. The encoder outputs the excitation pattern E[b] for the block.

Alternatively, the encoder uses another technique to measure the excitation of the critical bands of the block.

B. Computing Effective Excitation Pattern

Returning to FIG. 7*a*, from the excitation patterns E[b] and $\hat{E}$[b] for the original and the reconstructed frequency coefficients, respectively, the encoder computes (750) an effective excitation pattern $\tilde{E}$[b]. For example, the encoder finds the minimum excitation on a band by band basis between E[b] and $\hat{E}$[b]:

$$\tilde{E}[b]=\mathrm{Min}(E[b],\ \hat{E}[b]). \tag{15}$$

Alternatively, the encoder uses another formula to determine the effective excitation pattern. Excitation in the reconstructed signal can be more than or less the excitation in the original signal due to the effects of quantization. Using the effective excitation pattern $\tilde{E}$[b] rather than the excitation pattern E[b] for the original signal ensures that the masking component is present at reconstruction. For example, if the original frequency coefficients in a band are heavily quantized, the masking component that is supposed to be in that band might not be present in the reconstructed signal, making noise audible rather than inaudible. On the other hand, if the excitation at a band in the reconstructed signal is much greater than the excitation at that band in the original signal, the excess excitation in the reconstructed signal may itself be due to noise, and should not be factored into later NER calculations.

Figure 10:
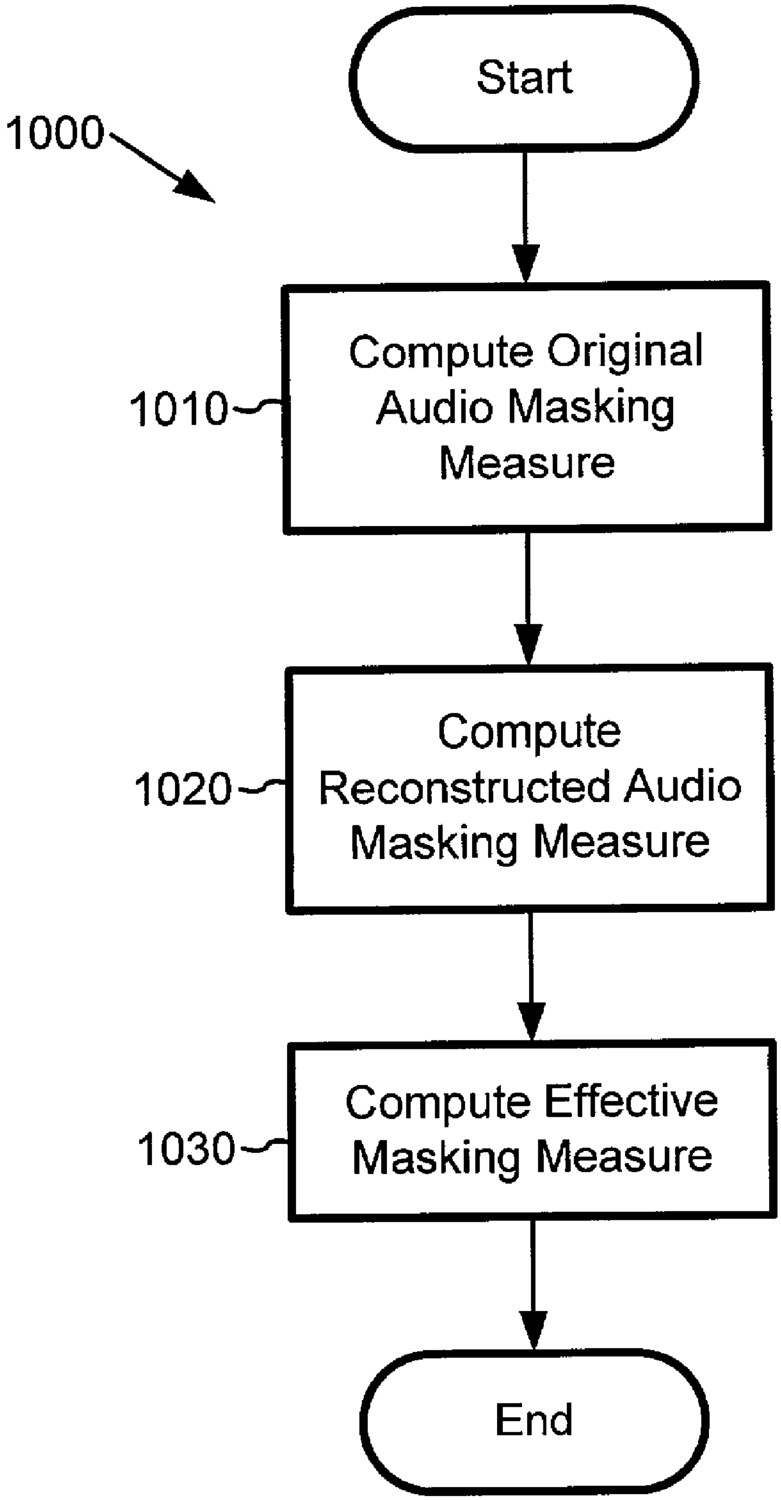
FIG. 10 is a flowchart showing a technique for computing an effective masking measure according to the illustrative embodiment.

FIG. 10 shows a technique (1000) for computing an effective masking measure in a broader context than FIGS. 7*a* through 7*d*. A tool such as an audio encoder computes (1010) an original audio masking measure. For example, the tool computes an excitation pattern for a block of original frequency coefficients. Alternatively, the tool computes another type of masking measure (e.g., masking threshold), measures something other than blocks (e.g., channels, entire signals), and/or measures another type of data.

The tool computes (1020) a reconstructed audio masking measure of the same general format as the original audio masking measure.

Next, the tool computes (1030) an effective masking measure based at least in part upon the original audio masking measure and the reconstructed audio masking measure. For example, the tool finds the minimum of two excitation patterns. Alternatively, the tool uses another technique to determine the effective excitation masking measure. For the sake of simplicity, FIG. 10 does not show repeated computation of the effective masking measure (as in a quantization loop) or other ways in which the technique (1000) can be used in conjunction with other techniques.

C. Computing Noise Pattern

Returning to FIG. 7*a*, the encoder computes (770) the noise pattern F[b] from the difference between the original frequency coefficients and the reconstructed frequency coefficients. Alternatively, the encoder computes the noise pattern F[b] from the difference between time series of original and reconstructed audio samples. The computing of the noise pattern F[b] uses some of the steps used in computing excitation patterns. FIG. 7*c* shows in greater detail the stage of computing (770) the noise pattern F[b].

First, the encoder computes (772) the differences between a block of original frequency coefficients X[k] and a block of reconstructed frequency coefficients $\hat{X}$[k] for 0≦k<(sub-frame_size/2). The encoder normalizes (774) the block of differences, taking as inputs the current sub-frame size and the maximum sub-frame size (if not pre-determined in the encoder). The encoder normalizes the size of the block to a standard size by interpolating values between frequency coefficients up to the largest time window/sub-frame size. For example, the encoder uses a zero-order hold technique (i.e., coefficient repetition):

$$DY[k]=\alpha(X[k']-\hat{X}[k']). \tag{16}$$

where DY[k] is the normalized block of interpolated frequency coefficient differences, α is an amplitude scaling factor described in Equation (10), and k' is an index in the sub-frame block described in Equation (8). Alternatively, the encoder uses other techniques to normalize the block.

After normalizing (774) the block, the encoder optionally applies (776) an outer/middle ear transfer function to the normalized block.

$$DY[k]\leftarrow A[k]\cdot DY[k]. \tag{17}$$

where A[k] is a transfer function as shown, for example, in FIG. 9.

The encoder next computes (778) the band energies for the block, taking as inputs the normalized block of frequency coefficient differences DY[k], the number and positions of the bands, the maximum sub-frame size, and the sampling rate. (Alternatively, one or more of the band inputs, size, or sampling rate is predetermined.) Using the normalized block of frequency coefficient differences DY[k], the energy within each critical band b is accumulated:

$$F[b]=\sum_{k\in B[b]} DY^2[k], \tag{18}$$

where B[b] is a set of coefficient indices that represent frequencies within critical band b as described in Equation 13. As the noise pattern F[b] represents a masked signal rather than a masking signal, the encoder does not smear the noise patterns of critical bands for simultaneous or temporal masking.

Alternatively, the encoder uses another technique to measure noise in the critical bands of the block.

D. Band Weights

Before computing NER for a block, the encoder determines one or more sets of band weights for NER of the block. For the bands of the block, the band weights indicate perceptual weightings, which bands are noise-substituted, which bands are truncated, and/or other weighting factors. The different sets of band weights can be represented in separate arrays (e.g., W[b], G[b], and Z[b]), assimilated into a single array of weights, or combined in other ways. The band weights can vary from block to block in terms of weight amplitudes and/or numbers of band weights.

Figure 11:
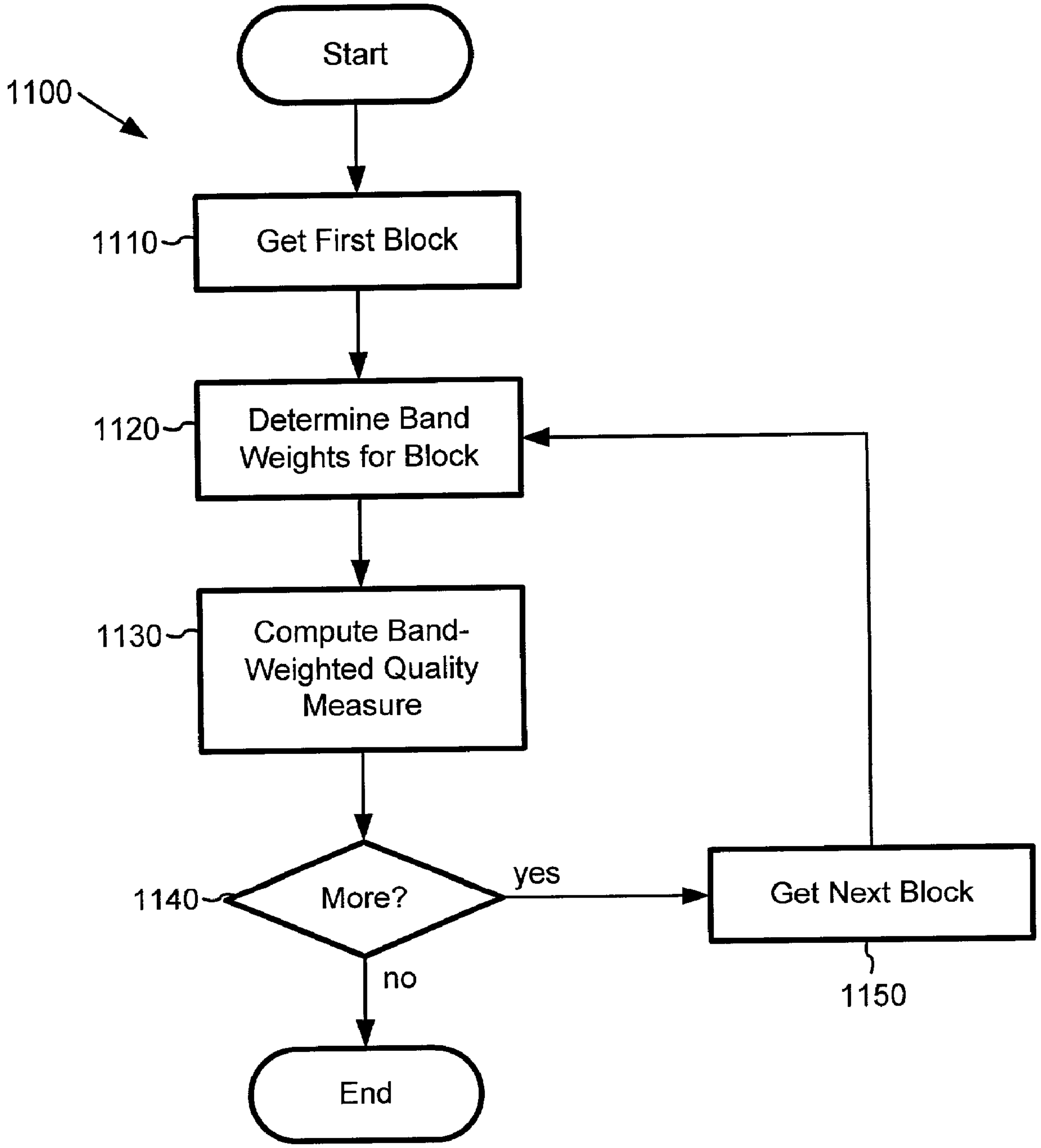
FIG. 11 is a flowchart showing a technique for computing a band-weighted quality measure according to the illustrative embodiment.

FIG. 11 shows a technique (1100) for computing a band-weighted quality measure for a block in a broader context than FIGS. 7*a* through 7*d*. A tool such as an audio encoder gets (1110) a first block of spectral data and determines (1120) band weights for the block. For example, the tool computes a set of perceptual weights, a set of weights indicating which bands are noise-substituted, a set of weights indicating which bands are truncated, and/or another set of weights for another weighting factor. Alternatively, the tool receives the band weights from another module. Within an encoding session, the band weights for one block can be different than the band weights for another block in terms of the weights themselves or the number of bands.

The tool then computes (1130) a band-weighted quality measure. For example, the tool computes a band-weighted NER. The tool determines (1140) if there are more blocks. If so, the tool gets (1150) the next block and determines (1120) band weights for the next block. For the sake of simplicity, FIG. 11 does not show different ways to combine sets of band weights, repeated computation of the quality measure for the block (as in a quantization loop), or other ways in which the technique (1100) can be used in conjunction with other techniques.

1. Perceptual Weights

Figure 12:
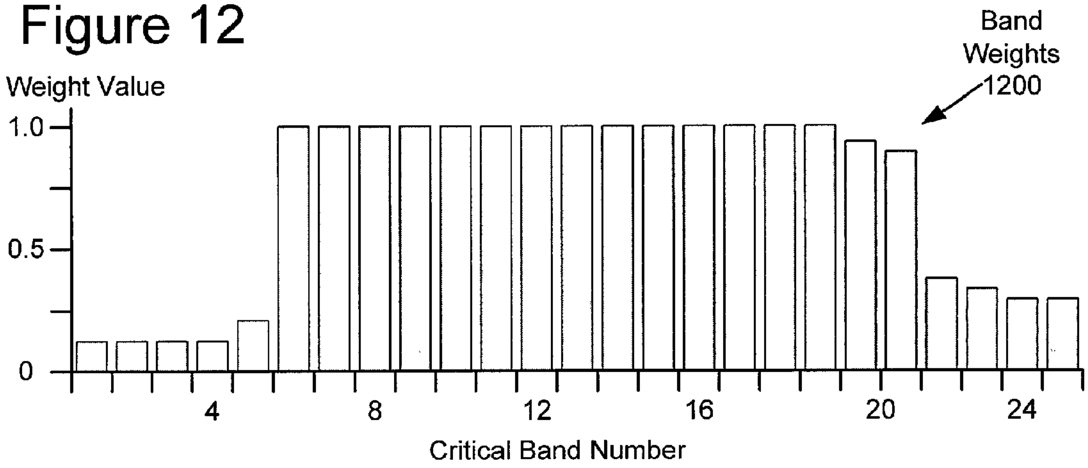
FIG. 12 is a graph showing a set of perceptual weights for critical band according to the illustrative embodiment.

With reference to FIG. 7*a*, a perceptual weight array W[b] accounts for the relative importance of different bands to the perceived quality of the reconstructed audio. In general, bands for middle frequencies are more important to perceived quality than bands for low or high frequencies. FIG. 12 shows an example of a set of perceptual weights (1200) for critical bands for NER computation. The middle critical bands are given higher weights than the lower and higher critical bands. The perceptual weight array W[b] can vary in terms of amplitudes from block to block within an encoding session; the weights can be different for different patterns of audio data (e.g., different excitation patterns), different applications (e.g., speech coding, music coding), different sampling rates (e.g., 8 kHz, 96 kHz), different bitrates of coding, or different levels of audibility of target listeners (e.g., playback at 40 dB, 96 dB). The perceptual weight array W[b] can also change in response to user input (e.g., a user adjusting weights based on the user's preferences).

2. Noise Substitution

In one implementation, the encoder can use noise substitution (rather than quantization of spectral data) to parametrically convey audio information for a band in low and mid-bitrate coding. The encoder considers the audio pattern (e.g., harmonic, tonal) in deciding whether noise substitution is more efficient than sending quantized spectral data. Typically, the encoder starts using noise substitution for higher bands and does not use noise substitution at all for certain bands. When the generated noise pattern for a band is combined with other audio information to reconstruct audio samples, the audibility of the noise is comparable to the audibility of the noise associated with an actual noise pattern.

Generated noise patterns may not integrate well with quality measurement techniques designed for use with actual noise and signal patterns, however. Using a generated noise pattern for a completely or partially noise-substituted band, NER or another quality measure may inaccurately estimate the audibility of noise at that band.

For this reason, the encoder of FIG. 7*a* does not factor the generated noise patterns of the noise-substituted bands into the NER. The array G[b] indicates which critical bands are noise-substituted in the block with a weight of 1 for each noise-substituted band and a weight of 0 for each other band. The encoder uses the array G[b] to skip noise-substituted bands when computing NER. Alternatively, the array G[b] includes a weight of 0 for noise-substituted bands and 1 for all other bands, and the encoder multiplies the NER by the weight 0 for noise-substituted bands; or, the encoder uses another technique to account for noise substitution in quality measurement.

An encoder typically uses noise substitution with respect to quantization bands. The encoder of FIG. 7*a* measures quality for critical bands, however, so the encoder maps noise-substituted quantization bands to critical bands. For example, suppose the spectrum of noise-substituted quantization band d overlaps (partially or completely) the spectrum of critical bands $b_{lowd}$ through $b_{highd}$. The entries G[$b_{lowd}$] through G[$b_{highd}$] are set to indicate noise-substituted bands. Alternatively, the encoder uses another linear or non-linear technique to map noise-substituted quantization bands to critical bands.

For multi-channel audio data, the encoder computes NER for each channel separately. If the multi-channel audio data is in independently coded channels, the encoder can use a different array G[b] for each channel. On the other hand, if the multi-channel audio data is in jointly coded channels, the encoder uses an identical array G[b] for all reconstructed channels that are jointly coded. If any of the jointly coded channels has a noise-substituted band, when the jointly coded channels are transformed into independently coded channels, each independently coded channel will have noise from the generated noise pattern for that band. Accordingly, the encoder uses the same array G[b] for all reconstructed channels, and the encoder includes fewer arrays G[b] in the output bitstream, lowering overall bitrate.

Figure 13:
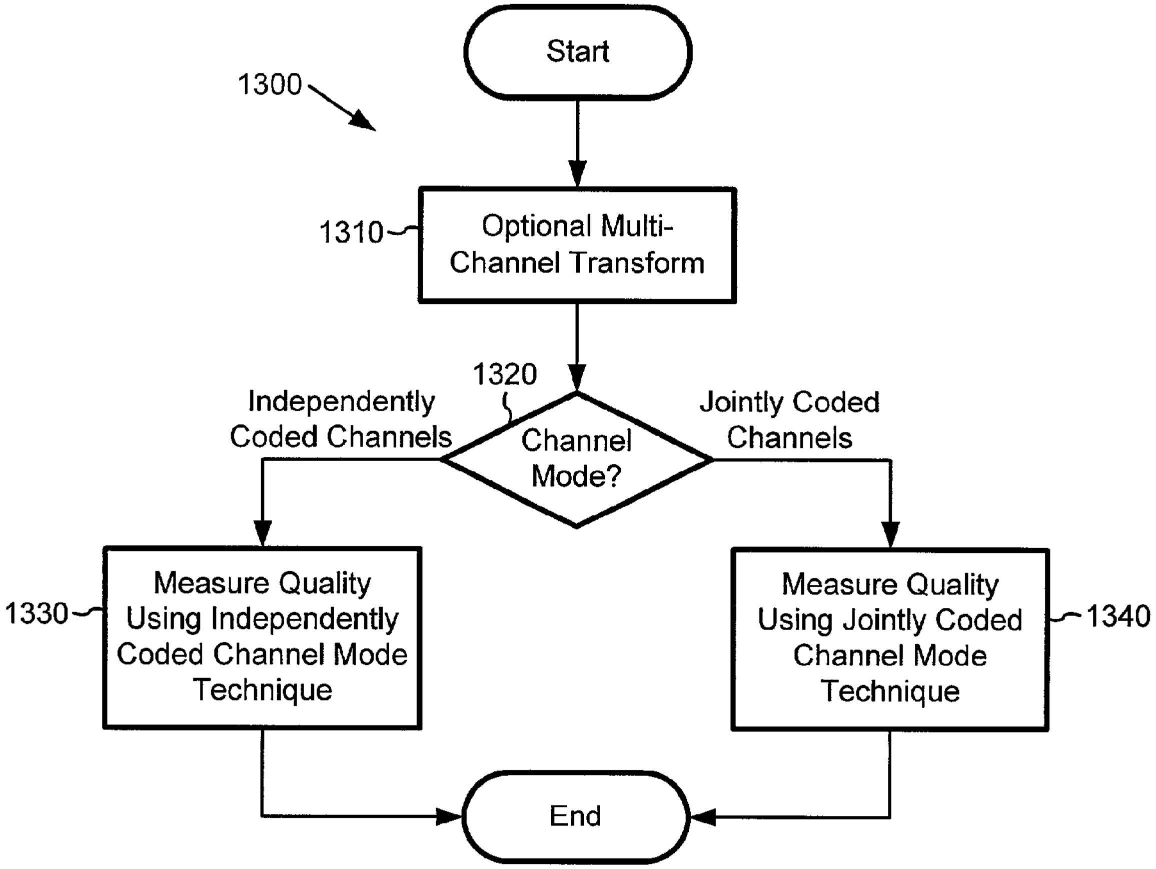
FIG. 13 is a flowchart showing a technique for measuring audio quality in a coding channel mode-dependent manner according to the illustrative embodiment.

More generally, FIG. 13 shows a technique (1300) for measuring audio quality in a channel mode-dependent manner. A tool such as an audio encoder optionally applies (1310) a multi-channel transform to multi-channel audio data. For example, a tool that works with stereo mode audio data optionally outputs the stereo data in independently coded channels or in jointly coded channels.

The tool determines (1320) the channel mode of the multi-channel audio data and then measures quality in a channel mode-dependent manner. If the data is in independently coded channels, the tool measures (1330) quality using a technique for independently coded channels, and if the data is in jointly coded channels, the tool measures (1340) quality using a technique for jointly coded channels. For example, the tool uses a different band weighting technique depending on the channel mode. Alternatively, the tool uses a different technique for measuring noise, excitation, masking capacity, or other pattern in the audio depending on the channel mode.

While FIG. 13 shows two modes, other numbers of modes are possible. For the sake of simplicity, FIG. 13 does not show repeated computation of the quality measure for the block (as in a quantization loop), or other ways in which the technique (1300) can be used in conjunction with other techniques.

3. Band Truncation

In one implementation, the encoder can truncate higher bands to improve audio quality for the remaining bands. The encoder can adaptively change the threshold above which bands are truncated, truncating more or fewer bands depending on current quality measurements.

When the encoder truncates a band, the encoder does not factor the quality measurement for the truncated band into the NER. With reference to FIG. 7*a*, the array Z[b] indicates which bands are truncated in the block with a weighting pattern such as one described above for the array G[b]. When the encoder measures quality for critical bands, the encoder maps truncated quantization bands to critical bands using a mapping technique such as one described above for the array G[b]. When the encoder measures quality of multi-channel audio data in jointly coded channels, the encoder can use the same array Z[b] for all reconstructed channels.

E. Computing Noise to Excitation Ratio

With reference to FIG. 7*a*, the encoder next computes (790) band-weighted NER for the block. For the critical bands of the block, the encoder computes the ratio of the noise pattern F[b] to the effective excitation pattern Ẽ[b]. The encoder weights the ratio with band weights to determine the band-weighted NER for a block of a channel c:

$$NER[c] = \sum_{all\ b} W[b]\frac{F[b]}{\tilde{E}[b]}. \quad (19)$$

Another equation for NER[c] if the weights W[b] are not normalized is:

$$NER[c] = \frac{\sum_{all\ b} W[b]\frac{F[b]}{\tilde{E}[b]}}{\sum_{all\ b} W[b]}. \quad (20)$$

Instead of a single set of band weights representing one kind of weighting factor or an aggregation of all weighting factors, the encoder can work with multiple sets of band weights. For example, FIG. 7*a* shows three sets of band weights W[b], G[b], and Z[b], and the equation for NER[c] is:

$$NER[c] = \frac{\sum_{all\ b\ where\ G[b]\neq 1\ and\ Z[b]\neq 1} W[b]\frac{F[b]}{\tilde{E}[b]}}{\sum_{all\ b\ where\ G[b]\neq 1\ and\ Z[b]\neq 1} W[b]}. \quad (21)$$

For other formats of the sets of band weights, the equation for band-weighted NER[c] varies accordingly.

For multi-channel audio data, the encoder can compute an overall NER from NER[c] of each of the multiple channels. In one implementation, the encoder computes overall NER as the maximum distortion over all channels:

$$NER_{overall} = \underset{All\ c}{\text{MAX}}(NER[c]). \quad (22)$$

Alternatively, the encoder uses another non-linear or linear function to compute overall NER from NER[c] of multiple channels.

F. Computing Noise to Excitation Ratio with Quantization Bands

Instead of measuring audio quality of a block by critical bands, the encoder can measure audio quality of a block by quantization bands, as shown in FIG. 7*d*.

The encoder computes (710, 730) the excitation patterns E[b] and Ê[b], computes (750) the effective excitation pattern Ẽ[b], and computes (770) the noise pattern F[b] as in FIG. 7*a*.

At some point before computing (791) the band-weighted NER, however, the encoder converts all patterns for critical bands into patterns for quantization bands. For example, the encoder converts (780) the effective excitation pattern Ẽ[b] for critical bands into an effective excitation pattern Ẽ[d] for quantization bands. Alternatively, the encoder converts from critical bands to quantization bands at some other point, for example, after computing the excitation patterns. In one implementation, the encoder creates Ẽ[d] by weighting Ẽ[b] according to proportion of spectral overlap (i.e., overlap of frequency ranges) of the critical bands and the quantization bands. Alternatively, the encoder uses another linear or non-linear weighting techniques for the band conversion.

The encoder also converts (785) the noise pattern F[b] for critical bands into a noise pattern F[d] for quantization bands using a band weighting technique such as one described above for Ẽ[d].

Any weight arrays with weights for critical bands (e.g., W[b]) are converted to weight arrays with weights for quantization bands (e.g., W[d]) according to proportion of band spectrum overlap, or some other technique. Certain weight arrays (e.g., G[d], Z[d]) may start in terms of quantization bands, in which case conversion is not required. The weight arrays can vary in terms of amplitudes or number of quantization bands within an encoding session.

The encoder then computes (791) the band-weighted as a summation over the quantization bands, for example using an equation given above for calculating NER for critical bands, but replacing the indices b with d.

Having described and illustrated the principles of our invention with reference to an illustrative embodiment, it will be recognized that the illustrative embodiment can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operation in accordance with teaching described herein. Elements of the illustrative embodiment shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. In an audio encoder with a quantization loop, a method comprising:

encoding audio, including:

reconstructing a block of spectral data for the audio, the block of spectral data quantized as plural quantization bands;

processing the reconstructed block of spectral data as plural critical bands according to an auditory model, wherein the plural critical bands are variable relative to the plural quantization bands with respect to one or more of number and position; and measuring quality of the reconstructed block of spectral data; and outputting the encoded audio in a bitstream.

2. The method of claim 1 wherein the encoding further includes:

before the quantization loop, applying a quantization matrix to the block of spectral data, thereby quantizing the block as the plural quantization bands;

quantizing the block of spectral data with a uniform, scalar quantization step size that is adjustable in response to one or more feedback criteria.

3. The method of claim 2 wherein the reconstructing comprises:

inverse quantizing the block of spectral data with the quantization step size; and inverse weighting the block of spectral data by the quantization matrix.

4. The method of claim 2 wherein the one or more feedback criteria are based at least in part upon the measured quality and a bitrate criterion.

5. The method of claim 1 wherein the measured quality is a ratio between a noise pattern and an effective excitation pattern for the block.

6. The method of claim 1 wherein the reconstructing comprises an inverse multi-channel transformation.

7. The method of claim 1 wherein the measuring comprises applying a set of band weights for the block.

8. The method of claim 1 wherein the measuring comprises measuring quality for each of the plural critical bands of the reconstructed block of spectral data.

9. The method of claim 1 wherein the measuring comprises measuring quality for each of the plural quantization bands of the reconstructed block of spectral data.

10. A computer-readable medium having encoded therein computer-executable instructions for causing a computer programmed thereby to perform a method comprising:

encoding audio, including, in an iteration of a quantization loop, reconstructing a block of frequency coefficients for the audio, the block of frequency coefficients quantized as plural quantization bands;

processing the reconstructed block as plural critical bands according to an auditory model, wherein the plural critical bands are variable relative to the plural quantization bands; and measuring quality of the reconstructed block; and outputting the encoded audio in a bitstream.

11. The computer-readable medium of claim 10 wherein the encoding further includes, in the iteration of the quantization loop:

adjusting quantization level as necessary to satisfy one or more loop criteria.

12. The computer-readable medium of claim 11 wherein the quantization level is a quantization step size, and wherein a quantization matrix and quantization band boundary matrix establishes the plural quantization bands before the iteration.

13. The computer-readable medium of claim 10 wherein the plural critical bands differ from the plural quantization bands in one or more of number and position.

14. The computer-readable medium of claim 10 wherein the reconstructing comprises an inverse multi-channel transformation.

15. The computer-readable medium of claim 10 wherein the measured quality is a ratio between a noise pattern and an effective excitation pattern for the block.

16. The computer-readable medium of claim 10 wherein the block has a variable size, further comprising normalizing the block before the processing.

17. An audio encoder with a quantization loop, the encoder comprising:

means for encoding audio, wherein the encoding includes:

reconstructing a block of spectral data for the audio, the block of spectral data quantized as plural quantization bands;

processing the reconstructed block of spectral data as plural critical bands according to an auditory model, wherein the plural critical bands are variable relative to the plural quantization bands with respect to one or more of number and position; and measuring quality of the reconstructed block of spectral data; and a multiplexer for outputting the encoded audio in a bitstream.

18. The encoder of claim 17 wherein the encoding further includes:

before the quantization loop, applying a quantization matrix to the block of spectral data, thereby quantizing the block as the plural quantization bands;

quantizing the block of spectral data with a uniform, scalar quantization step size that is adjustable in response to one or more feedback criteria.

19. The encoder of claim 18 wherein the reconstructing comprises:

inverse quantizing the block of spectral data with the quantization step size; and inverse weighting the block of spectral data by the quantization matrix.

20. The encoder of claim 18 wherein the one or more feedback criteria are based at least in part upon the measured quality and a bitrate criterion.

21. The encoder of claim 17 wherein the measured quality is a ratio between a noise pattern and an effective excitation pattern for the block.

22. The encoder of claim 17 wherein the reconstructing comprises an inverse multi-channel transformation.

23. The encoder of claim 17 wherein the measuring comprises applying a set of band weights for the block.

24. The encoder of claim 17 wherein the measuring comprises measuring quality for each of the plural critical bands of the reconstructed block of spectral data.

25. The encoder of claim 17 wherein the measuring comprises measuring quality for each of the plural quantization bands of the reconstructed block of spectral data.

* * * * *